United States Patent
Kamii et al.

(10) Patent No.: US 9,295,136 B2
(45) Date of Patent: Mar. 22, 2016

(54) LIGHTING DEVICE

(75) Inventors: Miwa Kamii, Osaka (JP); Youko Inoue, Nara (JP)

(73) Assignees: SHARP KABUSHIKI KAISHA, Osaka (JP); NARA WOMEN'S UNIVERSITY, Nara (JP)

(*) Notice: Subject to any disclaimer, the term of this patent is extended or adjusted under 35 U.S.C. 154(b) by 353 days.

(21) Appl. No.: 13/995,867

(22) PCT Filed: Dec. 16, 2011

(86) PCT No.: PCT/JP2011/079208
§ 371 (c)(1),
(2), (4) Date: Jun. 19, 2013

(87) PCT Pub. No.: WO2012/086548
PCT Pub. Date: Jun. 28, 2012

(65) Prior Publication Data
US 2013/0271039 A1    Oct. 17, 2013

(30) Foreign Application Priority Data

Dec. 20, 2010 (JP) ................................. 2010-282984
Jun. 16, 2011 (JP) ................................. 2011-134110

(51) Int. Cl.
*G05F 1/00* (2006.01)
*H05B 37/02* (2006.01)
*H05B 33/08* (2006.01)

(52) U.S. Cl.
CPC .............. *H05B 37/02* (2013.01); *H05B 33/086* (2013.01); *H05B 37/0272* (2013.01); *Y02B 20/40* (2013.01)

(58) Field of Classification Search
CPC .............. H05B 37/02; H05B 37/0281; H05B 33/0818; Y02B 20/42
USPC ......... 315/307, 360, 297, 291, 308–311, 209, 315/227, 313
See application file for complete search history.

(56) References Cited

U.S. PATENT DOCUMENTS

2003/0062856 A1* 4/2003 Yano et al. ..................... 315/291

FOREIGN PATENT DOCUMENTS

| JP | 7-65966 A | 3/1995 |
| JP | 11-204271 A | 7/1999 |
| JP | 2007-250350 A | 9/2007 |

* cited by examiner

Primary Examiner — Lincoln Donovan
Assistant Examiner — Thomas Skibinski
(74) Attorney, Agent, or Firm — Birch, Stewart, Kolasch & Birch, LLP

(57) ABSTRACT

In a memory of a lighting device, correspondence relations among an initial output, a target output and time required for reducing brightness from the initial output to the target output are stored in advance. When the initial output and the target output are designated (YES at S1), the time necessary for brightness reduction is specified from the correspondence relation (S3), and the light emission output is reduced at such a change rate that the light emission output has a linear relation with respect to elapsed time from the initial output to the target output in a specified time, on a semi logarithmic graph in which the ordinate is a logarithmic axis representing light emission output and the abscissa is a linear axis representing time (S5).

5 Claims, 32 Drawing Sheets

FIG.1
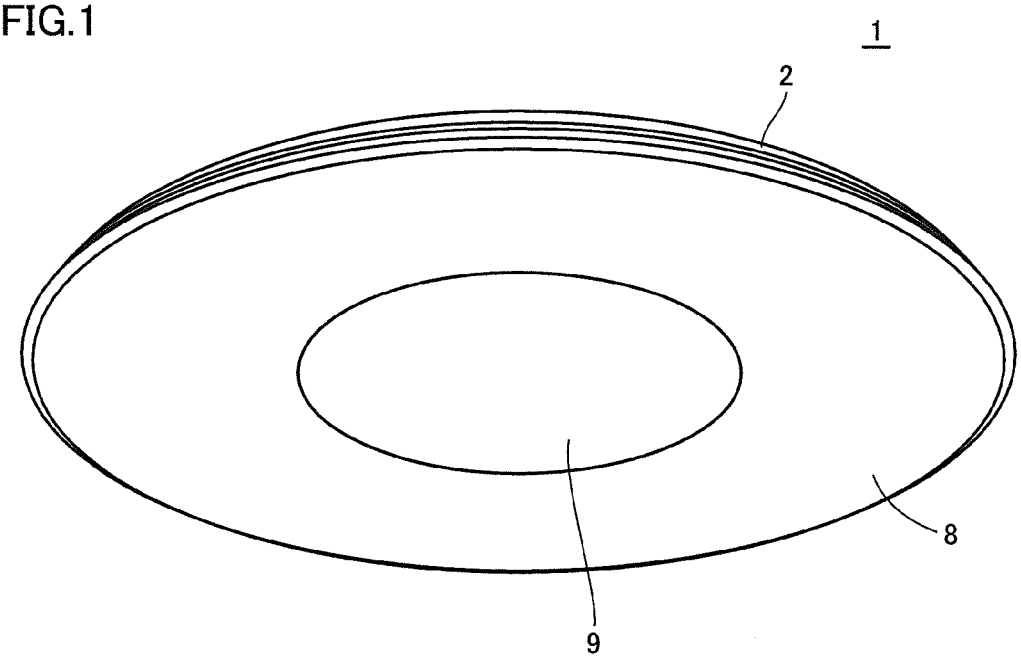
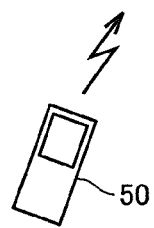

RELATION BETWEEN ACCUMULATED DECLARATION RATIO AND CHANGE RATE ($E_1$=300, Sa=0.29; ACCEPTABILITY OF TEMPORAL CHANGE)

RATIO (%) OF ILLUMINANCE $E_2$ AFTER CHANGE TO INITIAL ILLUMINANCE $E_1$

RELATION BETWEEN ACCUMULATED DECLARATION RATIO AND CHANGE RATE ($E_1$=150, Sa=0.29; ACCEPTABILITY OF TEMPORAL CHANGE)

RATIO (%) OF ILLUMINANCE $E_2$ AFTER CHANGE TO INITIAL ILLUMINANCE $E_1$

| Sa | 750Lx | 300Lx | 150Lx |
|---|---|---|---|
| 0.29 | 8.5 | 21.0 | 39.2 |
| 0.1 | 4.4 | 11.0 | 20.0 |
| 0.03 | 2.4 | 6.0 | 11.0 |
| 0 | 0 | 0 | 0 |

| 750Lx | | 300Lx | | 150Lx | |
|---|---|---|---|---|---|
| E2 | T | E2 | T | E2 | T |
| 100 | | 100 | | 100 | |
| 64 | 3.7 | 63 | 2.3 | 59 | 1.4 |
| 33 | 14 | 33 | 9.9 | 30 | 7.2 |
| 18 | 50.4 | 18 | 37.8 | 17 | 29.7 |

FIG.21

| | y=ax^b | x=E₂ | y=T |
|---|---|---|---|
| | E1 | A | "-B" |
| | 1000 | | |
| | 750 | 17478 | 2.038 |
| | 300 | 23500 | 2.224 |
| | 150 | 25362 | 2.405 |
| | 1 | | |

FIG.26

| INITIAL ILLUMINANCE E$_1$ [lx] | 30   140   280   680   1100 |
|---|---|
| INITIAL COLOR TEMPERATURE Tc$_1$ [lx] | 3000  4100  5700 |
| DIMMING RATE STc [K/min] | ∞   0.28   0.09   0.06   0.03   0.01 |
| COLOR TEMPERATURE CHANGE RATE Tc$_2$/Tc$_1$ | 1.20  1.12  1.07  1.04  1.03  0.97<br>0.96  0.93  0.88  0.80  1.90  1.60  1.38<br>1.17  0.85  0.72  0.61  0.54  0.48 |

FIG.27

| INITIAL ILLUMINANCE E$_1$ [lx] | INITIAL COLOR TEMPERATURE Tc$_1$ [lx] | COLOR TEMPERATURE CHANGE RATE Tc$_2$/Tc$_1$ |
|---|---|---|
| 140 | 3000 | 0.80 |
|  |  | 0.88 |
|  |  | 0.931 |
|  |  | 0.959 |
| 280 | 4100 | 0.986 |
|  |  | 1.027 |
|  |  | 1.045 |
|  |  | 1.073 |
| 1100 | 5700 | 1.12 |
|  |  | 1.20 |

FIG.28A

| $Tc_2/Tc_1$ \ $Tc_1$ | $E_1$ 30[lx] | | | 300[lx] | | | 1100[lx] | | |
|---|---|---|---|---|---|---|---|---|---|
| | 3000K | 4100K | 5700K | 3000K | 4100K | 5700K | 3000K | 4100K | 5700K |
| 0.71 | | | | | | ◇4000K | | | |
| 0.54 | | | | | | ◆3000K | | | |
| 0.48 | | | | | | ◆2700K | | | |

◇ MEASURED 3 TIMES WITH DIMMING RATE 0.063 [K/min]
◆ DIMMING RATE CHANGED IN 3 STEPS(0.063,0.032,0.015)

FIG.28B

| $Tc_2/Tc_1$ \ $Tc_1$ | $E_1$ 30[lx] | | | 300[lx] | | | 1100[lx] | | |
|---|---|---|---|---|---|---|---|---|---|
| | 3000K | 4100K | 5700K | 3000K | 4100K | 5700K | 3000K | 4100K | 5700K |
| 1.90 | ●5700K | | | ●5700K | | | ●5700K | | |
| 1.60 | | | | ●4800K | | | | | |
| 1.38 | | | | ●4100K | ●5700K | | | | |
| 1.17 | | | | ◎3500K | ●4800K | | | | |
| 0.85 | | | | | ◎3500K | ●4800K | | | |
| 0.72 | | | | | ●3000K | ●4100K | | | |
| 0.54 | | | | | | ◎3500K | | | |
| 0.48 | | | ●3000K | | | ●3000K | | | ●3000K |

● DIMMING RATE CHANGED IN 3 STEPS(0.28,0.093,0.015)
◎ MEASURED 3 TIMES WITH DIMMING RATE 0.28 [K/min]

| STc | 4100[K]UP | 3000[K]UP | 4100[K]DOWN | 5700[K]DOWN |
|---|---|---|---|---|
| ∞ | 1.06 | 1.06 | 0.93 | 0.88 |
|  |  |  |  |  |
| 0.28 | 1.10 | 1.10 | 0.88 | 0.78 |
| 0.093 | 1.11 | 1.29 | 0.65 | 0.65 |
| 0.063 |  |  |  | 0.53 |
| 0.032 |  |  |  | 0.42 |
| 0.014 | 1.88 | 3.36 | 0.17 | 0.17 |

FIG.40

|  | INITIAL COLOR TEMPERATURE $Tc_1(K)$ | TARGET COLOR TEMPERATURE $Tc_2(K)$ | NECESSARY TIME $t(MIN)$ |
|---|---|---|---|
| UP | 4100 | 4340 | 0.0 |
|  | 4100 | 4517 | 0.2 |
|  | 4100 | 4553 | 0.5 |
|  | 4100 | 7689 | 19.5 |
|  | 3000 | 3181 | 0.0 |
|  | 3000 | 3299 | 0.1 |
|  | 3000 | 3875 | 1.2 |
|  | 3000 | 10072 | 37.6 |
| DOWN | 4100 | 3809 | 0.0 |
|  | 4100 | 3619 | 0.2 |
|  | 4100 | 2662 | 2.0 |
|  | 4100 | 694 | 55.1 |
|  | 5700 | 5016 | 0.0 |
|  | 5700 | 4464 | 0.4 |
|  | 5700 | 3701 | 2.0 |
|  | 5700 | 3023 | 4.4 |
|  | 5700 | 2372 | 11.9 |
|  | 5700 | 965 | 55.1 |

LIGHTING DEVICE

TECHNICAL FIELD

The present invention relates to a lighting device and, more specifically, to a lighting device of which light emission output is controlled.

BACKGROUND ART

Light environment created by a lighting device has significant psychological and biological influences on humans. Therefore, appropriate design of light environment is one of basic elements to attain healthy and comfortable living environment.

On the other hand, similar to other electrical appliances, the lighting device is also required to have an energy saving function.

As an example of the energy saving function of a conventional lighting device, Japanese Patent Laying-Open No. 11-204271 (Patent Document 1) proposes a method of gradually lowering, from the start point of lighting of lighting load, output of lighting load to reduce brightness to a prescribed light intensity.

CITATION LIST

Patent Document

PTD 1: Japanese Patent Laying-Open No. 11-204271

SUMMARY OF INVENTION

Technical Problem

However, When the brightness is gradually reduced, a user may feel uncomfortable if the change rate of light emission output is high, that is, if the brightness is reduced in an abrupt manner.

On the other hand, the method of reducing light emission output in proportion to the elapsed time as the method of gradually reducing brightness proposed in Patent Document 1 has a problem that considerable energy is consumed and hence it is difficult to attain the energy saving function. Specifically, human visual appreciation has such a characteristic that sensitivity to the change in illuminance becomes higher as the target low illuminance comes closer. In other words, if the change rate of brightness reduction or dimming is high near the low illuminance, it would be uncomfortable to the user. For this reason, in order to reduce brightness while alleviating the feeling of discomfort, it is necessary to make smaller the rate of change (inclination) of brightness reduction, that is, to make longer the time necessary for reducing brightness. Longer time of brightness reduction, however, leads to a problem of increased power consumption.

The present invention was made in consideration of such a problem, and one of its objects is to provide a lighting device allowing reduction in brightness in a comfortable environment without causing any feeling of discomfort to people, while attaining the energy saving function.

Solution to Problem

In order to attain the above-described object, according to an aspect, the present invention provides a lighting device, including a light emitting unit and a control circuit for executing output control of the light emitting unit. When light emission output is to be changed, the control circuit gradually reduces light emission output of the light emitting unit, linearly from a first light emission output to a second light emission output in a prescribed time from the start of the change, on a semi logarithmic graph having the abscissa as a linear axis representing time and the ordinate as a logarithmic axis representing light emission output.

Preferably, the prescribed time is defined by determining the first and second light emission outputs.

More preferably, the prescribed time T for changing from the first light emission output $E_1$ to the second light emission output $E_2$ is defined by $T=k\cdot\exp(mE_1)\cdot E_2\hat{}(q\cdot\ln E_1+n)$ or $T=k\cdot\exp(mE_1)\cdot E_2\hat{}(q'E_1 n')$ (constants: k, m, q (q'), n (n')), using the first light emission output $E_1$ and the second light emission output $E_2$.

Alternatively, or more preferably, the prescribed time T for changing from an initial color temperature $Tc_1$ as the first light emission output to a target color temperature $Tc_2$ as the second light emission output is defined as $\log(R)=+A\cdot STc^v$ if the initial color temperature $Tc_1<$ the target color temperature $Tc_2$, and $\log(R)=-A\cdot STc^v$ if the initial color temperature $Tc_1>$ target color temperature $Tc_2$ (where color temperature change rate $R=Tc_2/Tc_1$, dimming rate $STc=|\log(Tc_1)-\log Tc_2)|/T=|\log(R)|/T$, constant:v) where constant A is a constant defined by determining the initial color temperature $Tc_1$ and the target color temperature $Tc_2$.

More preferably, the constant A is represented as $A=a\cdot Tc_1+b$ (initial color temperature $Tc_1<$ target color temperature $Tc_2$), $A=a\cdot Tc_1+d$ (initial color temperature $Tc_1>$ target color temperature $Tc_2$) (where constants: a, b, c, d).

Advantageous Effects of Invention

The present invention enables reduction of brightness in a comfortable environment without causing any feeling of discomfort to humans, while attaining the energy saving function.

BRIEF DESCRIPTION OF DRAWINGS

FIG. 1 shows an appearance of a lighting device in accordance with an embodiment of the present invention.

FIG. 21 shows combinations of variables A and (−B) in an approximate expression of $T=AE_2\hat{\ }B$ obtained from the graph of FIG. 20.

FIG. 26 shows lighting conditions in a second experiment conducted by the inventors.

FIG. 27 shows lighting conditions for "Instantaneous Change Experiment" in the second experiment.

FIG. 28A shows lighting conditions for "Temporal Change Experiment 1" as lighting conditions of "Temporal Change Experiment" in the second experiment.

FIG. 28B shows lighting conditions for "Temporal Change Experiment 2" as lighting conditions of "Temporal Change Experiment" in the second experiment.

FIG. 40 shows relations between the target color temperature and the time necessary for the change, on the increasing side and the decreasing side, respectively, for each initial color temperature, to attain the 80% acceptance ratio.

DESCRIPTION OF EMBODIMENTS

Figure 2:
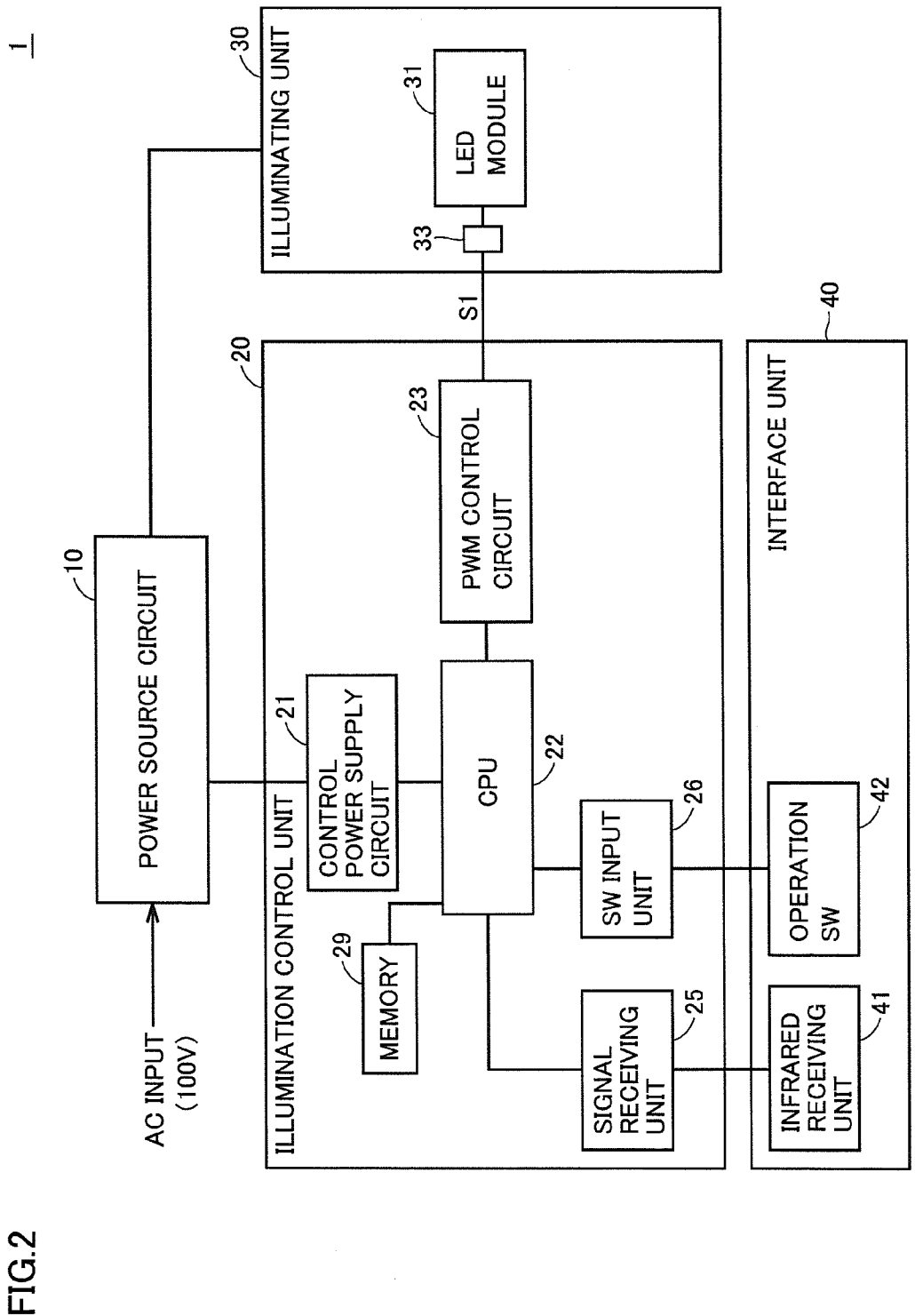
FIG. 2 is a schematic block diagram showing hardware of the lighting device.

In the following, embodiments of the present invention will be described with reference to the figures. In the following description, the same components are denoted by the same reference characters. Their names and functions are also the same.

<Device Configuration>

FIG. 1 shows an appearance of a lighting device 1 in accordance with an embodiment of the present invention. Lighting device 1 shown in FIG. 1 is a so-called ceiling light, used fixed on a ceiling.

Referring to FIG. 1, lighting device 1 is shown having a chassis 2 for fixing a main body part, and covers 8 and 9 for covering the entire surface of main body part together with chassis 2. As an example, here, it is assumed that chassis 2 of lighting device 1 is fixed on a ceiling.

Cover 8 is provided corresponding to an area where a LED module for illumination is arranged. Light is emitted from the area of cover 8.

The other cover 9 provided near the center of cover 8 is provided corresponding to an area where a control device such as a circuit board for controlling the LED module is arranged. Since no LED module is arranged in the area corresponding to cover 9, light is not emitted therefrom.

A portable remote controller 50 is provided for operating lighting device 1. By operating remote controller 50, various operation instructions can be issued to lighting device 1.

FIG. 2 is a schematic block diagram showing hardware of lighting device 1.

Referring to FIG. 2, lighting device 1 in accordance with the present embodiment includes a power source circuit 10, an illumination control unit 20, an illuminating unit 30, and an interface unit 40.

Power source circuit 10 receives an alternating current (AC) power input (100V), converts it to a DC voltage, and supplies the voltage to various portions of the device. Though the voltage is shown to be supplied only to a control power supply circuit 21 and illuminating unit 30 as an example here, it is not limiting, and necessary voltage is supplied to other portions as well.

Illumination control unit 20 is formed of: a control power supply circuit 21 for adjusting the voltage supplied from power source circuit 10 to be supplied to a CPU (Central Processing Unit) 22; CPU 22 for overall control of lighting device 1; a PWM (Pulse Width Modulation) control circuit 23; a signal receiving unit 25; an SW input unit 26; and a memory 29. CPU 22, memory 29 and PWM control circuit 23 are implemented by micro-computers.

CPU 22 is connected to various units and outputs control signals for instructing necessary operations to control lighting device 1 as a whole.

PWM control circuit 23 generates PWM pulses necessary for driving an LED module 31, which will be described later, in accordance with an instruction from CPU 22.

Signal receiving unit 25 is connected to an infrared receiving unit 41 included in interface unit 40, and outputs an instruction signal to CPU 22 in response to an infrared signal received by an infrared receiving unit 41.

SW input unit 26 is connected to an operation SW (switch) 42 and outputs an instruction signal in accordance with the operation of operation SW to CPU 22.

Memory 29 stores various programs and initial values for controlling lighting device 1 of various types, and it is also used as a working memory of CPU 22.

Illuminating unit 30 includes an LED module 31 as a light source, and an FET (Field Effect Transistor) switch 33 used for driving LED module 31. FET switch 33 may be provided in PWM control circuit 23.

Though an example having an LED of one type (LED module 31) as a light source is shown here, a plurality of LEDs having different color temperatures may be provided as the light source, or a plurality of light source sets, each set consisting of a plurality of LEDs of different color temperatures, may be provided. Though it is assumed that an LED (LED module 31) is included in illuminating unit 30 as a light source, a light source such as a fluorescent lamp, or an EL (Electro-Luminescence) may be included in place of (or in addition to) the LED.

Interface unit 40 includes infrared receiving unit 41 and operation SW 42. Infrared receiving unit 41 receives the infrared signals from remote controller 50, executes photoelectric conversion of the infrared signals, and outputs the results to signal receiving unit 25.

Operation SW 42 includes a power switch and the like, and an instruction in response to a switch operation, such as a user's operation of a power switch, is output through SW input unit 26 to CPU 22. It is assumed that when the power switch in on, necessary power is supplied to lighting device 1 and if the power switch is off, power is not supplied to lighting device 1. Various operations described in the present example are realized when the power switch is on.

Figure 3:
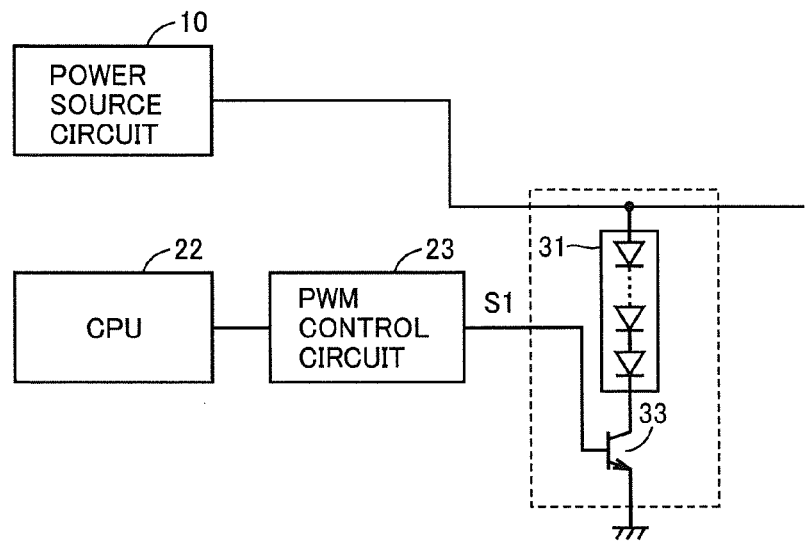
FIG. 3 illustrates a configuration of an LED module included in the lighting device.

FIG. 3 illustrates a configuration of a LED module 31 in accordance with an embodiment of the present invention.

Referring to FIG. 3, CPU 22 instructs PWM control circuit 23 to generate and output PWM pulse S1 for driving LED module 31.

LED module 31 receives supply of necessary voltage from power source circuit 10. Between LED module 31 and a ground voltage GND, FET switch 33 is provided.

When FET switch 33 is rendered conductive/non-conductive in response to PWM pulse S1, electric current is supplied/stopped to LED module 31. When electric current is supplied to LED module 31, LED module 31 emits light. Though a configuration for driving LED module 31 has been described above, the configuration is similar even when a plurality of other LED modules are additionally provided.

Remote controller 50 is provided with at least a button for instructing light-on/light-off, and a button for increasing/decreasing light emission output.

When the user presses the button for instructing light-on/light-off, a light-on control instruction/light-off control instruction is output from remote controller 50.

Receiving an input of light-on control instruction from remote controller 50, CPU 22 of lighting device 1 instructs PWM control circuit 23 to start light-on control of lighting device 30. Thus, in response to pressing of the button for instructing light-on, that is, in response to an input of light-on control instruction from remote controller 50, light having dimming rate of 100% is emitted from illuminating unit 30.

The output of light emitted from illuminating unit 30 is adjusted stepwise or continuously, by the button for instructing increase/decrease of the light emission output. By way of example, assume a state of full-lighting (dimming rate 100%) after the button instructing light-on is pressed. If the button for decreasing dimming rate is pressed, the emission will be half-lighting (dimming rate 50%), and if the button for decreasing dimming rate is again pressed in this state, the emission will be dim-lighting (dimming rate 30%). If the button for increasing dimming rate is pressed in this state, the emission will be half-lighting (dimming rate 50%), and if the button for increasing dimming rate is pressed in this state, the emission will be full-lighting (dimming rate 100%). It is assumed that the current dimming rate is stored in memory 29.

If the user presses the button for instructing light-off while the light is on, a light-off control instruction is output from remote controller 50. CPU 22 of lighting device 1 receives the input of light-off control instruction from remote controller 50, and instructs PWM control circuit 23 to turn off illuminating unit 30. Consequently, in response to pressing of the button for instructing light-off, that is, an input of light-off control instruction from remote controller 50, emission of light from illuminating unit 30 ends.

In order to output such control signals, remote controller 50 at least includes, as hardware configuration, an operation SW (switch), not shown, a memory for storing the control signals, a transmitting unit for reading and transmitting, in response to an operation signal from the operation SW, a corresponding control signal from the memory, and an infrared projecting unit converting the signal output from the transmitting unit to an infrared signal and projecting it to lighting device 1.

Though a portable remote controller 50 has been described as a mechanism for outputting control signals to lighting device 1 in the example above, it is not limiting, and a remote controller fixed on a wall may be used. Alternatively, the remote controller may be provided as a part of interface unit 40 of lighting device 1. In that case, in place of transmitting the signal of operation SW by infrared signal, the instruction signal from operation SW may be directly transmitted using a signal line. Further, signal transmission/reception may not be limited to infrared transmission, and wireless transmission, for example, is also possible.

<Outline of Light Emission Output Control>

In lighting device 1, when brightness of light is to be reduced from a certain light emission output (initial output) to a set light emission output (target output), reduction of brightness is possible without causing any discomfort to the user, while reducing energy consumption. Here, the change in light emission output includes change in illuminance and change in color temperature.

According to a first method of reducing brightness in which the light emission output is linearly reduced with respect to time, in order to reduce brightness while alleviating the feeling of discomfort, the inclination of reduction is made smaller, or the time for reducing brightness is made longer, as the human visual appreciation has such a characteristic that sensitivity to the change in illuminance becomes higher as the target low illuminance comes closer. Therefore, though the first method is effective to alleviate the feeling of discomfort of the user, considerable energy is consumed as the time necessary for brightness reduction is long.

Figure 4:
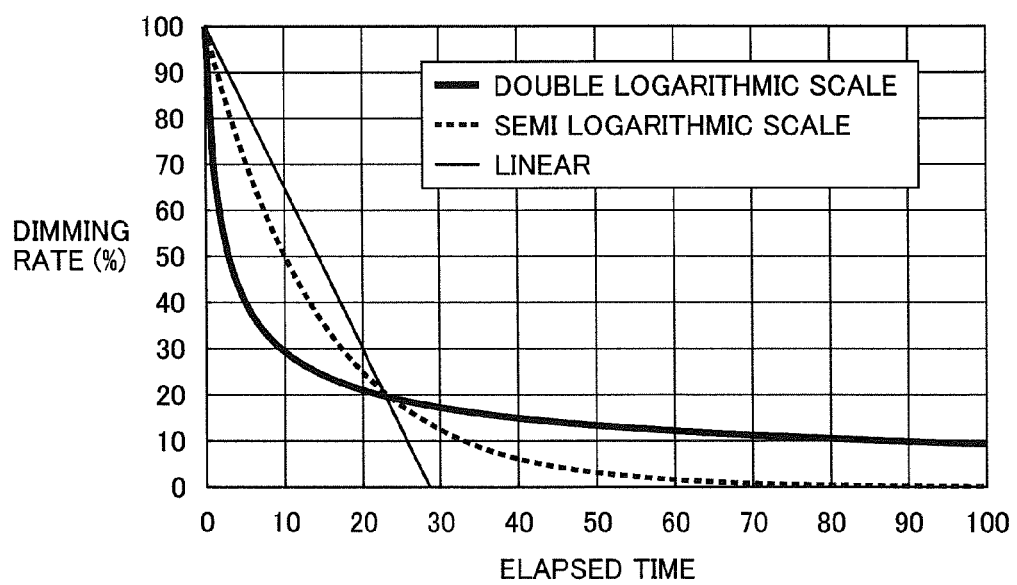
FIG. 4 shows a specific example of a change in dimming rate shown in a linear graph, when the dimming rate is linearly reduced with respect to time, in a graph of double logarithmic scale in which the ordinate representing light emission output and the abscissa representing time are both logs.

As another method of reducing brightness, a second method is possible, in which the light emission output is reduced linearly with time in a graph of double logarithmic scale, in which both the ordinate representing the light emission output and the abscissa representing time are logs. FIG. 4 shows a specific example of a change in dimming rate in accordance with the second method, shown in a linear graph, in which the ordinate and the abscissa are both linear. In FIG. 4, the change in dimming rate when the brightness is reduced in accordance with the second method is plotted in a thick line. For comparison, the change in dimming rate when reduction is done linearly in a semi logarithmic graph is plotted in a dotted line, and the change in dimming rate when reduction is done linearly in a linear graph is plotted in a thin line. As shown in FIG. 4, according to the second method, the dimming rate changes significantly immediately after the start of brightness reduction. Specifically, immediately after the start of brightness reduction, the light emission output reduces abruptly. Therefore, it is highly possible that even the second method causes the user discomfort. If the time for brightness reduction is made longer to make smaller the inclination near the initial output, energy consumption increases due to the longer time of brightness reduction, and the energy saving effect will be undermined.

Therefore, in lighting device 1, a third method is used for reducing brightness, in which the light emission output is reduced linearly with respect to time, in a semi logarithmic graph in which the ordinate is log and the abscissa is linear, with the ordinate representing light emission output and the abscissa representing time.

Figure 5:
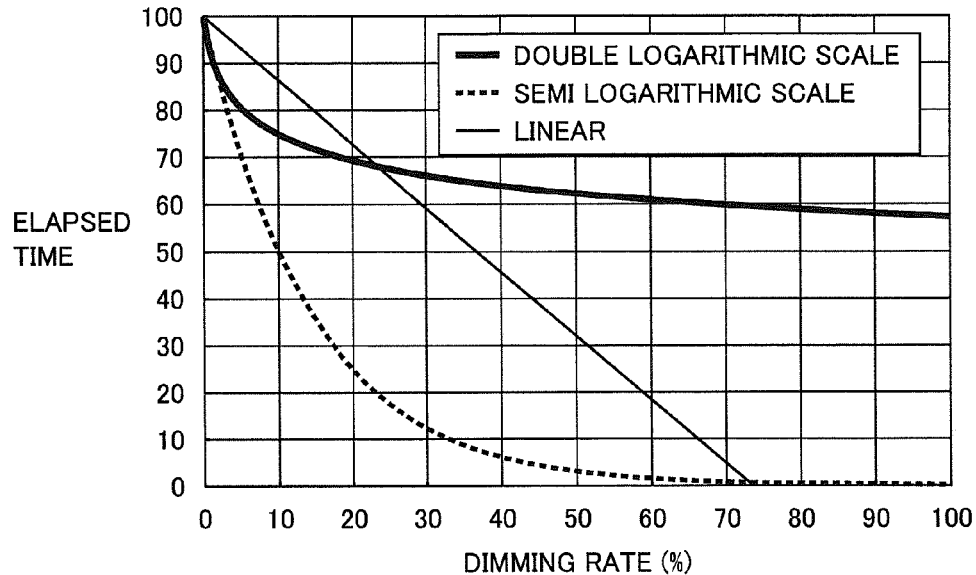
FIG. 5 shows specific examples of the change in dimming rate attained by different manners of brightness reduction, represented in a linear graph.

FIG. 5 shows specific examples of the change in dimming rate attained by different manners of brightness reduction, represented in a linear graph. In FIG. 5, the change in dimming rate when brightness is reduced by the third method is plotted in a dotted line. For comparison, the change in dimming rate when reduction is done in linear manner in a graph of double logarithmic scale is plotted in a thick line, and further, the change in dimming rate when reduction is done in linear manner in a linear graph is plotted in a thin line.

Referring to FIG. 5, control of light emission output in accordance with the third method enables reduction of energy consumption until the target output is attained as compared with the first method. Thus, this method realizes superior energy saving function. Further, as compared with the second method, the change in light emission output immediately after the start of brightness reduction is smaller. In other words, the light emission output reduces less abruptly than in the second method, immediately after the start of brightness reduction. Therefore, it is possible to better alleviate user's discomfort than in the second method. Further, the third method of changing the light emission output in logarithmic scale causes such a human perception that the light is reduced at a constant rate, and the resulting change of light emission output matches the mechanism of human perception. Thus, the feeling of discomfort to the user can be alleviated.

In order to realize the control of light emission output as represented by the third method described above, signal receiving unit 25 or SW input unit 26 of lighting device 1 receives designations of an initial output $E_1$ and a target output $E_2$. Target output $E_2$ may be a pre-set value, or a value obtained by multiplying initial output $E_1$ by a pre-set ratio.

Memory 29 stores correspondence relations among initial output $E_1$, target output $E_2$ and time t necessary for reducing the light emission output from initial output $E_1$ to target output $E_2$. By reading time t from the correspondence relations, CPU 22 specifies the time t necessary for reducing brightness. CPU 22 controls the light emission output with such a change rate that the light emission output changes linearly from initial output $E_1$ to target output $E_2$ in time t, on a semi logarithmic graph in which the ordinate is a logarithmic axis and the abscissa is a linear axis, with the ordinate representing light emission output and the abscissa representing time.

Thus, in lighting device 1, the time t necessary for reducing brightness from initial output $E_1$ to target output $E_2$ changes depending on the initial output $E_1$ and the target output $E_2$. Further, the change rate thereof, that is, the linear inclination mentioned above also changes.

The example of correspondence relations among initial output $E_1$, target output $E_2$ and time t necessary for reducing the light emission output from initial output $E_1$ to target output $E_2$ stored in memory 29 is obtained through experiments conducted by the inventors. Therefore, a first experiment conducted by the inventors to obtain the correspondence relations above will be described in the following.

<Description of the First Experiment>

The inventors conducted an experiment in accordance with the following procedure, on 30 female participants of ages 18 to 22, belonging to the group of young females that is generally said to have highest sensitivity to colors and brightness.

STEP 1: All participants are brought into a laboratory, and an initial state, in which the light emission output of lighting device 1 in the room is set to the initial output, is maintained for 10 minutes (acclimation period), while contents of the experiment are described.

STEP 2: After STEP 1, start of experiment is announced to the participants, and the light emission output of lighting device 1 is changed from the initial output to the target output, in accordance with the set change rate.

The change rate at STEP 2 represents the rate at which the light emission output reduces exponentially in proportion to the elapsed time, that is, the change rate at which the light emission output changes in a linear relation with respect to time, on a semi logarithmic graph in which the abscissa is a linear axis representing time and the ordinate is a linear axis representing light emission output.

An absolute value of line inclination on the semi logarithmic graph is defined as a value Sa representing the change rate. As described above, in the semi logarithmic graph, the ordinate is a logarithmic axis representing the light emission output (illuminance or color temperature) and the abscissa is a linear axis representing elapsed time. Therefore, the line inclination on the graph as the value Sa representing change rate is obtained by dividing a difference between initial output $E_1$ and target output $E_2$ in logs by the time t necessary for the change. Specifically, the value is given by Equation (1) below:

$$Sa \text{ [lx/min]} = |(\log E_1 - \log E_2)/t| \qquad \text{Equation (1).}$$

The inventors conducted STEP 1 and STEP 2 as described above as a series of experiments on the participants, and thereafter, asked each participant to answer questions on an evaluation sheet. Then, the above-described experiments were repeated with the change rate of light emission output varied. Between the series of experiments and the experiments after varying the change rate of light emission output, there was an acclimation period of 1 to 5 minutes, as the initial state. Regarding the change of light emission output, experiments were conducted with respect to the change in illuminance and the change in color temperature, respectively.

The questions on the evaluation sheet includes items such as: degree of awareness regarding the change in light emission output; degree of comfort/discomfort; acceptability; evaluation of impression of the room after the change; and actions considered unsuitable to take under such lighting environment. Particularly, the question related to the "acceptability" as an item used for statistical processing as will be described later was presented in the form of a multi-choice task including four options of "(the change in light emission output is) unacceptable," "hardly acceptable," "barely acceptable" and "fairly acceptable." As to other question items, for example, the question related to the evaluation of impression of the room asks the participant to select either one of each of the pairs "dark"—"bright", "chromatic"—"achromatic" and "dislikable"—"likable." The question related to the action considered unsuitable to take in the lighting environment is presented as a multi-choice task including nine events, that is, "study/read a book," "read a magazine/newspaper," "watch television," "have a meal," "relax," "enjoy chatting together," "do light exercise," "listen to the music" and "sleep."

The experiments for changing the illuminance were conducted using three different initial outputs of 750 [lx (lux)], 300 [lx] and 150 [lx], three different target outputs of 80% (i.e., brightness reduction rate of 20%), 64% (brightness reduction rate of 36%) and 50% (brightness reduction rate of 50%) of the initial output, and three different time periods of 20 seconds, 1 minute and 3 minutes to attain brightness reduction of 20%, with the color temperature fixed at 2700 [K]. Only for the target output of brightness reduction rate of 36% from the initial output, experiments were also conducted with color temperature of 5600 [K].

The experiments for changing the color temperature were conducted using a color temperature initial output of 5600 [K], three different target outputs of 400 [K], 3000 [K] and 2700 [K] and three different time periods of 5 minutes, 10 minutes and 20 minutes to attain the reduction from 5600 [K] to 2700 [K], with the illumination initial output of 300 [lx].

FIGS. 6 to 14 show results of statistical processing on the answers from the participants of these experiments. As the statistical process, for each ratio of target output $E_2$ as the illuminance after the change with respect to the initial output $E_1$, the ratio (%) of the number of answers corresponding to each option for the questions related to acceptability described above to the entire body of participants (30 participants) was calculated. The values of "unacceptable," "hardly acceptable," "barely acceptable" and "fairly acceptable" shown in FIGS. 6 to 14 are each an integrated (accumulated) value, accumulating values of these options in this order. Specifically, the value of "hardly acceptable" is the value obtained by adding the ratio of "unacceptable" to the ratio of "hardly acceptable," and the value of "barely acceptable" is a value obtained by adding the ratios of "unacceptable," "hardly acceptable" and "barely acceptable." A similar integrated value is used for "fairly acceptable." The ratio of target output $E_2$ as the illuminance after change with respect to the initial output $E_1$, used as the abscissa in FIGS. 6 to 14, is given as $\log (E_2/E_1)$.

In the following description, the ratio of illuminance plotted on the abscissa will also be referred to as "change ratio" and the ratio of answers plotted on the ordinate will also be referred to as "accumulated declaration ratio." If the change ratio is 0%, that is, if "the ratio of target output $E_2$ with respect to the initial output $E_1$" is 100% and $\log (E_2/E_1)=0$, it means that the state is unchanged from the initial output $E_1$. The larger change ratio means that the difference between the initial output $E_1$ and the target output $E_2$ is larger and it indicates a state where the brightness is much more reduced, that is, the state in which "the ratio of target output $E_2$ with respect to the initial output $E_1$" becomes smaller and the value log $(E_2/E_1)$ becomes closer to −2.

In FIGS. 6 to 14, a thick line represents a regression line for the answers "hardly acceptable," a dotted line represents a regression line for the answers "barely acceptable," a chain-dotted line represents a regression line for the answers "fairly acceptable" and a chain-double-dotted line represents a regression line for the answers "unacceptable." The regression lines were calculated from the data shown in FIGS. 6 to 14, assuming that the accumulated declaration ratio was 0% when "the ratio of $E_2$ with respect to $E_1$" was 100% (log $(E_2/E_1)$=0), that is, when the change ratio was 0%.

It is noted that the regression line of "hardly acceptable" is calculated using conditions 1) and 2) below as restrictions:

1) As the value Sa representing the change rate of light emission output becomes larger, gradient (inclination) of the regression line becomes larger. Specifically, $E_1/E_2$ (threshold change ratio) becomes smaller (becomes closer to 0 on the abscissa), and significant change from initial output $E_1$ to target output $E_2$ is impossible.

2) As the initial output $E_1$ becomes larger, the gradient becomes smaller. Specifically, $E_1/E_2$ (threshold change ratio) becomes larger (becomes closer to −2 on the abscissa), and significant change from initial output $E_1$ to target output $E_2$ is possible.

The method of calculating the regression lines is not limit to the above, and general method of calculation such as least square method may be used, with the above-described restrictions added.

Figure 6:
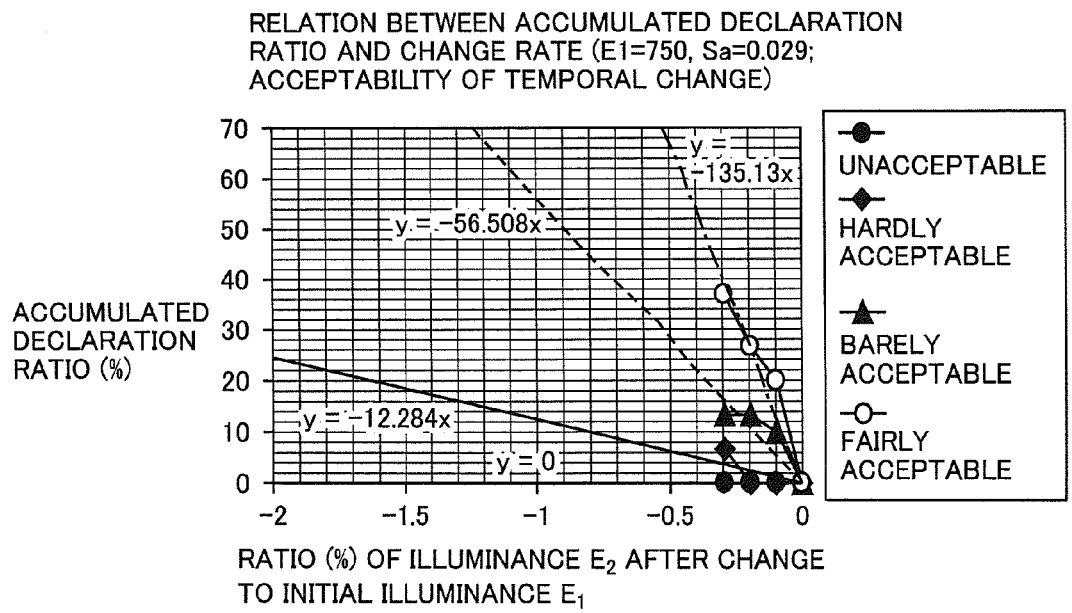
FIG. 6 shows a result of statistical processing of answers obtained from participants of a first experiment conducted by the inventors.
Figure 7:
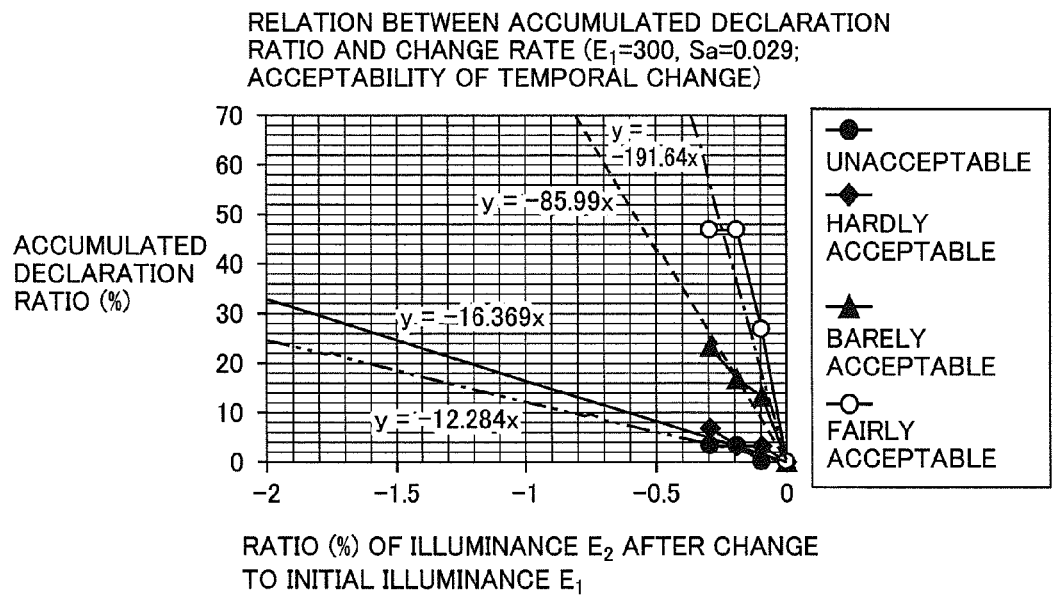
FIG. 7 shows a result of statistical processing of answers obtained from participants of the first experiment conducted by the inventors.
Figure 8:
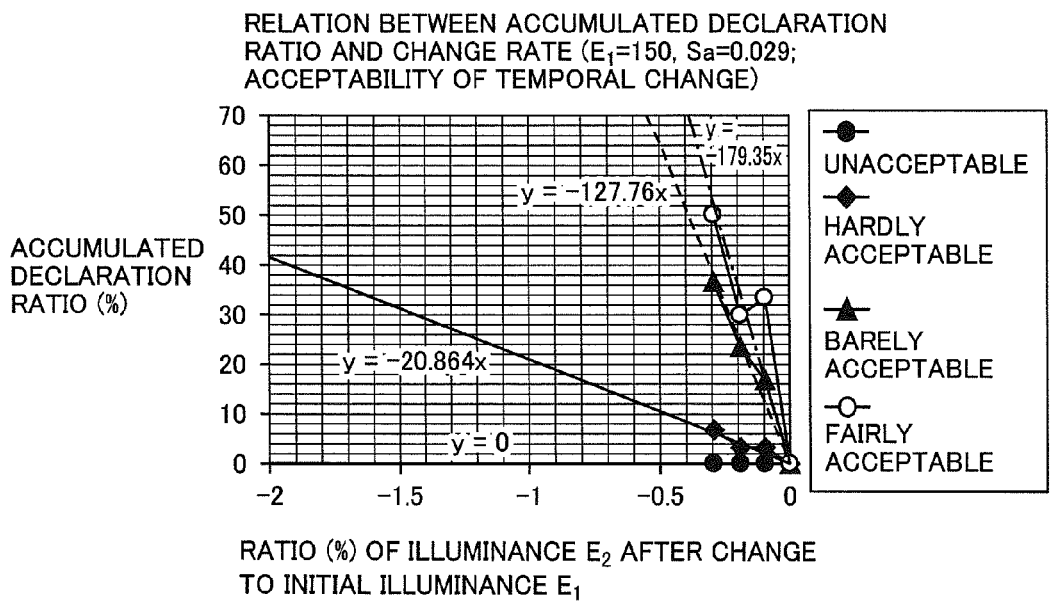
FIG. 8 shows a result of statistical processing of answers obtained from participants of the first experiment conducted by the inventors.

FIGS. 6 to 8 show relations between the accumulated declaration ratio and the change ratio when the illuminance was varied, with the value Sa representing the change rate of light emission output being 0.029. Specifically, FIG. 6 shows the relation between the accumulated declaration ratio and the change ratio when the initial output was 750 [lx], FIG. 7 shows the relation when the initial output was 300 [lx] and FIG. 8 shows the relation when the initial output was 150 [lx].

Figure 9:
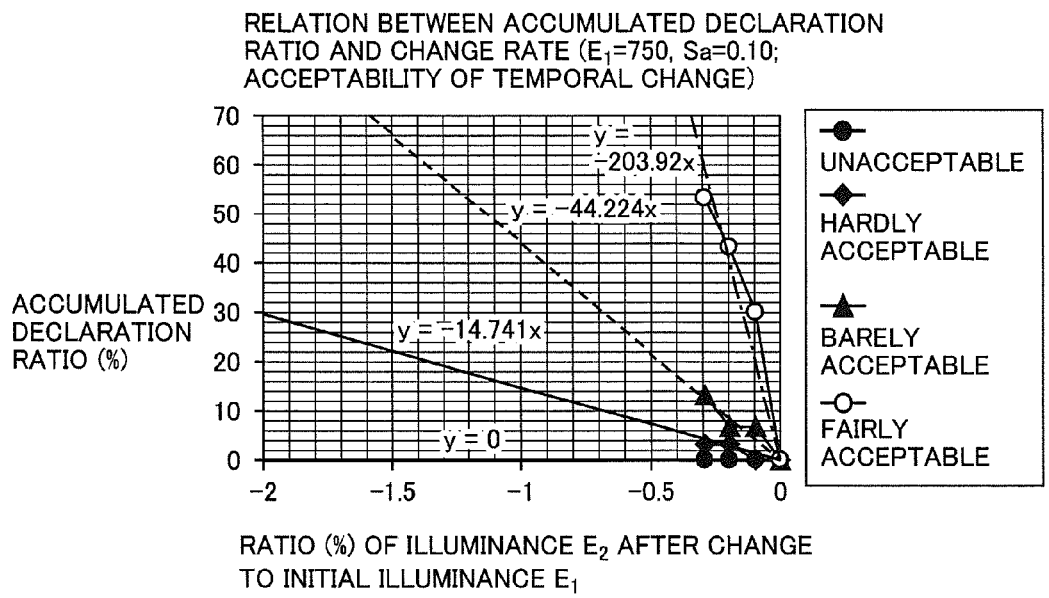
FIG. 9 shows a result of statistical processing of answers obtained from participants of the first experiment conducted by the inventors.
Figure 10:
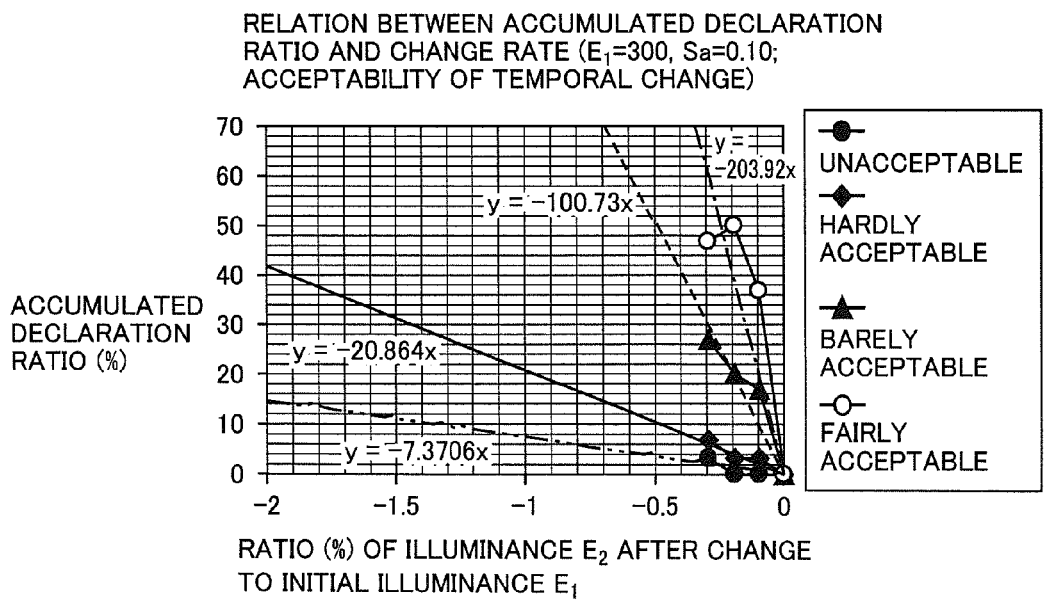
FIG. 10 shows a result of statistical processing of answers obtained from participants of the first experiment conducted by the inventors.
Figure 11:
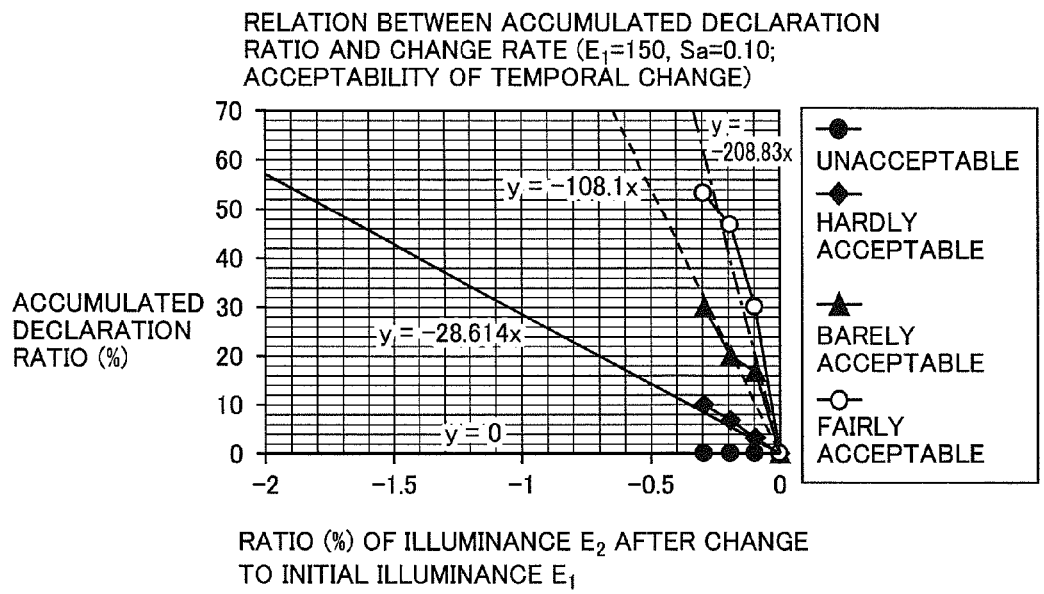
FIG. 11 shows a result of statistical processing of answers obtained from participants of the first experiment conducted by the inventors.

FIGS. 9 to 11 show relations between the accumulated declaration ratio and the change ratio when the illuminance was varied, with the value Sa representing the change rate of light emission output being 0.10. Specifically, FIG. 9 shows the relation between the accumulated declaration ratio and the change ratio when the initial output was 750 [lx], FIG. 10 shows the relation when the initial output was 300 [lx] and FIG. 11 shows the relation when the initial output was 150 [lx].

Figure 12:
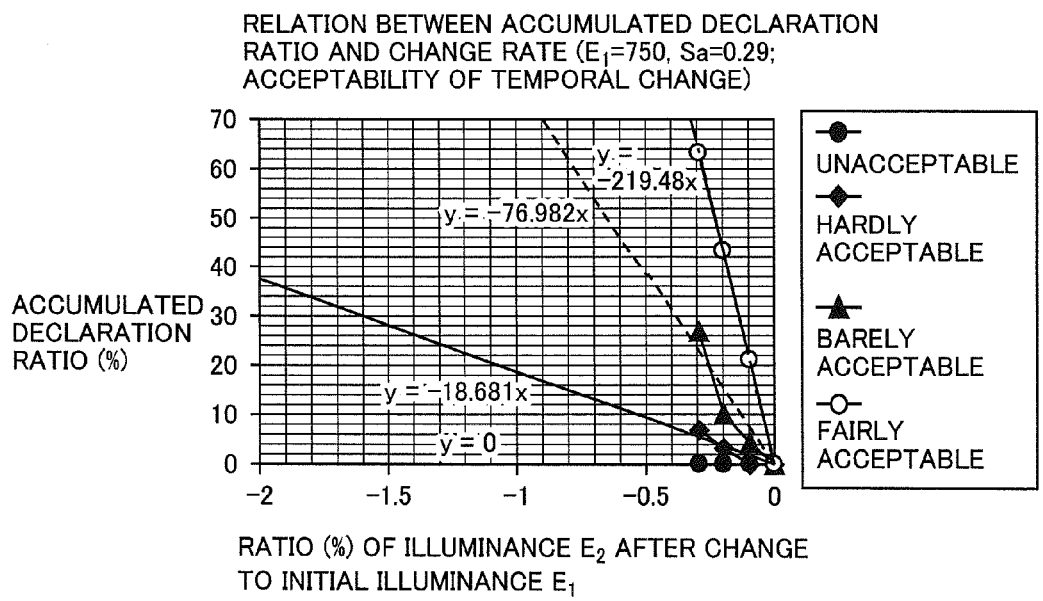
FIG. 12 shows a result of statistical processing of answers obtained from participants of the first experiment conducted by the inventors.
Figure 13:
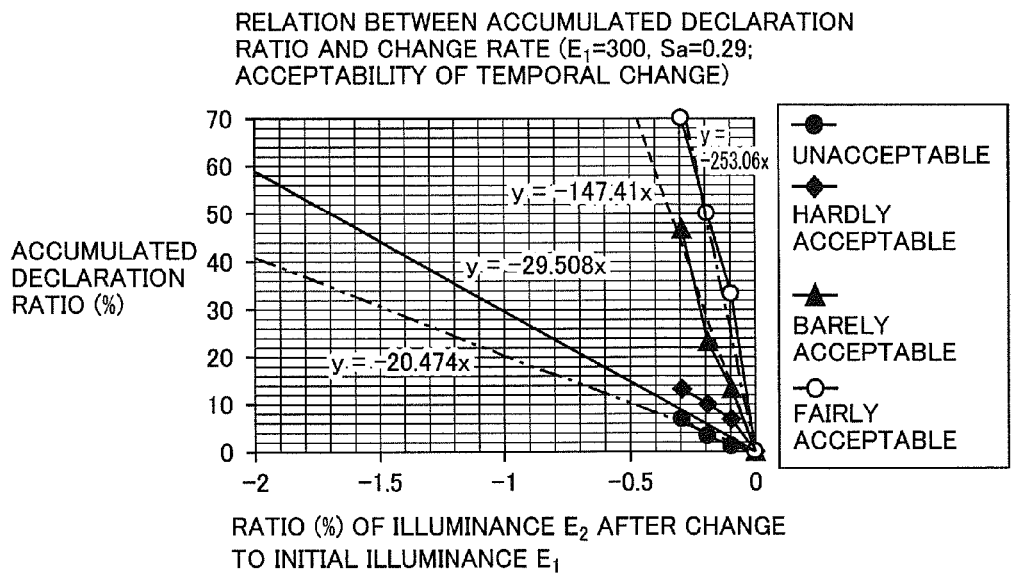
FIG. 13 shows a result of statistical processing of answers obtained from participants of the first experiment conducted by the inventors.
Figure 14:
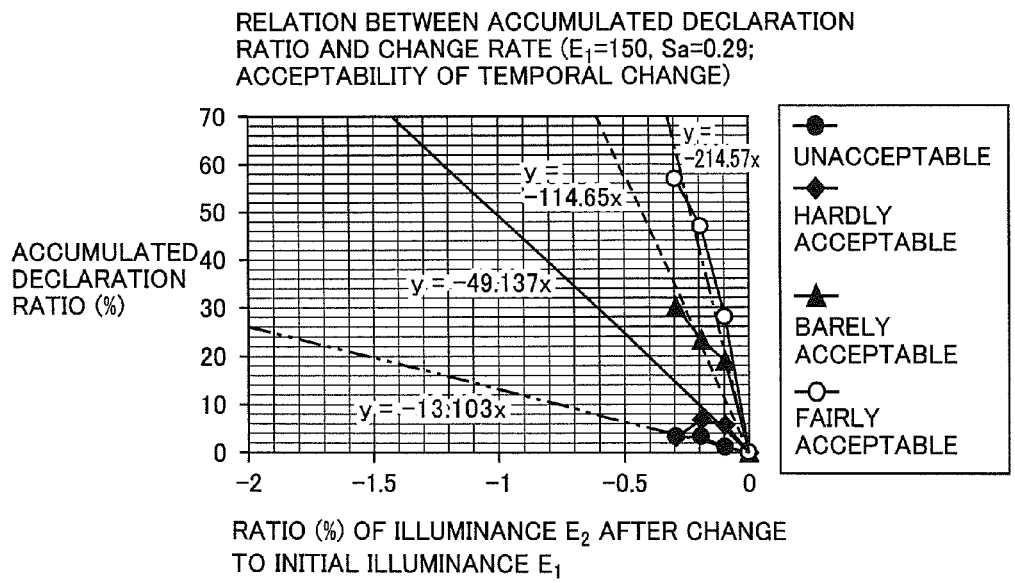
FIG. 14 shows a result of statistical processing of answers obtained from participants of the first experiment conducted by the inventors.

FIGS. 12 to 14 show relations between the accumulated declaration ratio and the change ratio when the illuminance was varied, with the value Sa representing the change rate of light emission output being 0.29. Specifically, FIG. 12 shows the relation between the accumulated declaration ratio and the change ratio when the initial output was 750 [lx], FIG. 13 shows the relation when the initial output was 300 [lx] and FIG. 14 shows the relation when the initial output was 150 [lx]. Here, 80% of participants whose answer was other than "unacceptable" or "hardly acceptable" are classified as participants who answered "acceptable."

From the statistical results, the inventors read the change ratio when the ratio (accumulated declaration ratio) of the answers "unacceptable" and "hardly acceptable" to the whole body of participants (30 participants) was 20% as the "threshold change ratio." Specifically, the inventors read the value on the abscissa at a point where the thick line intersects a line parallel to the abscissa and representing 20% of the ordinate as the threshold change ratio, in the statistical results of FIGS. 6 to 14. In other words, the "threshold change ratio" is the change ratio acceptable to 80% of all participants, when the brightness is reduced with the rate of reduction changed at a certain change rate.

Though the inventors read the change ratio when the accumulated declaration ratio was 20% in the statistical processing of experimental results as the threshold change ratio, the accumulated declaration ratio to be read as the threshold change ratio is not limited to 20%. It may be appropriately selected depending on the user, usage environment or intended use of lighting device 1.

Figures 15, 16:
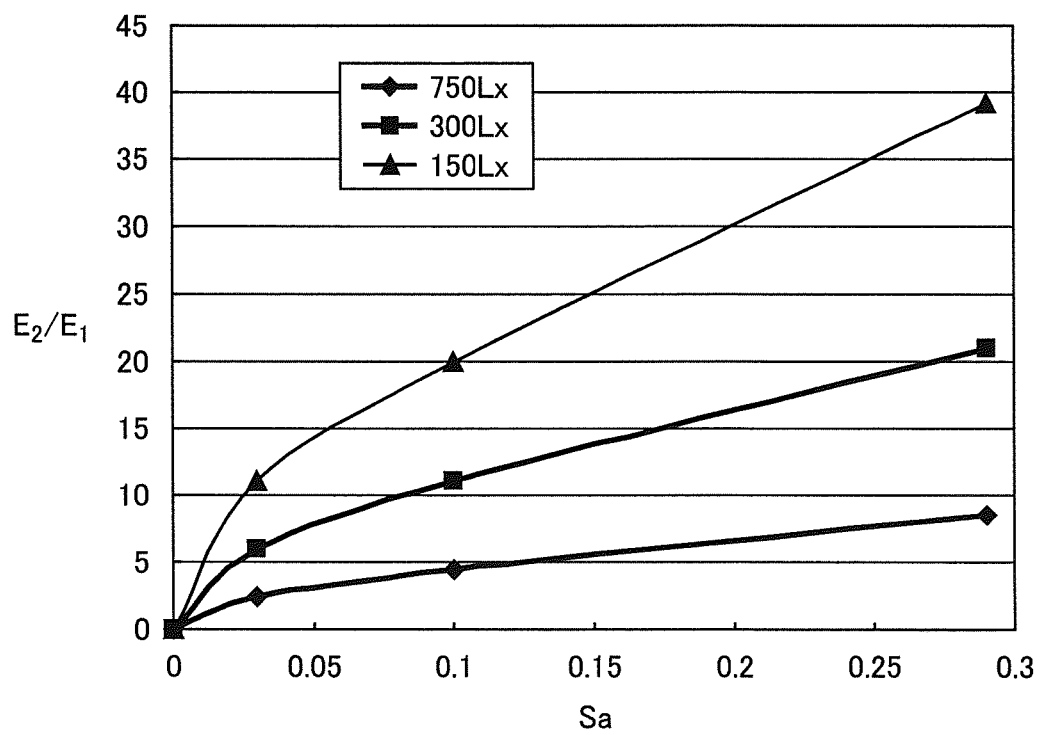
FIG. 15 shows read threshold change ratio for each initial output and each value representing change rate of illuminance.
FIG. 16 shows transition of the threshold change ratio with respect to the value representing change rate of illuminance, for each initial output, based on the relations shown in FIG. 15.

FIG. 15 shows read threshold change ratio for each initial output and each value Sa representing change rate of light emission output. FIG. 16 shows transition of the threshold change ratio with respect to the value Sa representing change rate of light emission output, for each initial output $E_1$, based on the relations shown in FIG. 15.

Referring to FIG. 16, it is generally understood that if the value Sa representing the change rate of light emission output is small, the threshold change ratio is small and if the value Sa is large, the threshold change ratio is large, regardless of the value of initial output $E_1$. In other words, as the difference between the light emission outputs to be reduced becomes larger, the change rate of light emission output should be made smaller, that is, the manner of brightness reduction should be more moderate, to have approximately 20% of the participants accept the control of brightness reduction.

Further, from FIG. 16, it can be seen that the threshold change ratio becomes smaller as the value of initial output $E_1$ becomes larger. Specifically, if the initial output $E_1$ is larger, greater change, with the target output $E_2$ made smaller, would be acceptable.

It should be noted, however, that even if the change ratio is the same, or even if the brightness is reduced to the target output of the same ratio, the change rate of light emission output acceptable to approximately 20% of the participants differs depending on the initial output $E_1$. Therefore, in order to find more detailed relations, the inventors calculated the target output $E_2$ as the threshold change ratio and a value Sa representing the change rate of light emission output at that time for each initial output $E_1$, based on the read threshold change ratio for each value Sa shown in FIG. 15, using the definition of change ratio and Equation (1) above. The results are as shown in FIG. 17.

Figures 17, 18:
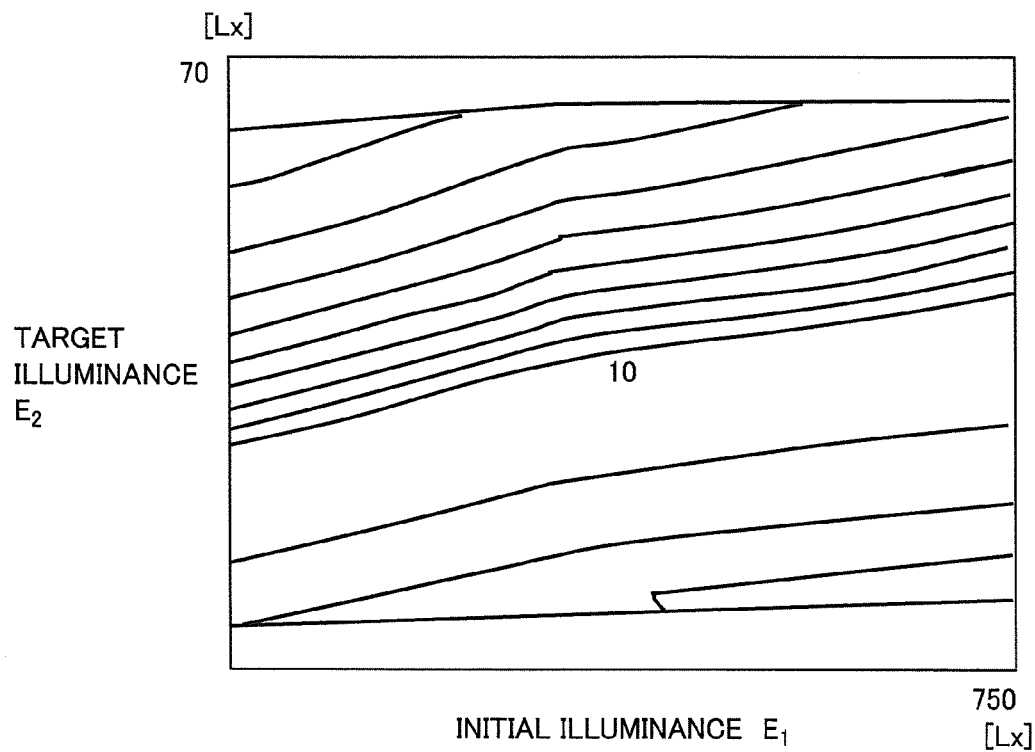
FIG. 17 shows target outputs attaining the threshold change ratio and the corresponding change rates of illuminance for each initial output, calculated from the read threshold change ratio for each value representing the change rate of illuminance and the initial output shown in FIG. 15.
FIG. 18 shows a relation of suitable illuminance change rate for each target output and initial output, obtained by forming a distribution chart from FIG. 17.

The inventors formed a distribution chart from the relations shown in FIG. 17, and thereby obtained the relations shown in FIG. 18, representing appropriate relation of change rate in light emission output for each initial output $E_1$ and each target output $E_2$.

FIG. 18 is a graph of double logarithmic scale plotting initial output $E_1$ [lx] on the abscissa and target output $E_2$ [lx] on the ordinate, representing a regression aspect of three-dimensional distribution obtained by identifying a position of threshold change ratio on the graph and allocating the time t [min] necessary to attain the change of light emission output at that time. A space between contour lines of time t necessary for the change of light emission output in the graph represents a logarithmic axis. In the three-dimensional distribution of FIG. 18, the relation between the threshold change ratio and the time t necessary for the change of light emission output is indicated on the regression surface.

As described above, the accumulated declaration rate read as the threshold change ratio can be selected appropriately and, therefore, the relation is not limited to the one shown in FIG. 18. Specifically, the relation of appropriate time t for brightness reduction for each initial output $E_1$ and each target output $E_2$ shown in FIG. 18 is only an example obtained as a result of experiments conducted by the inventors.

<Light Emission Output Control 1>

Figure 19:
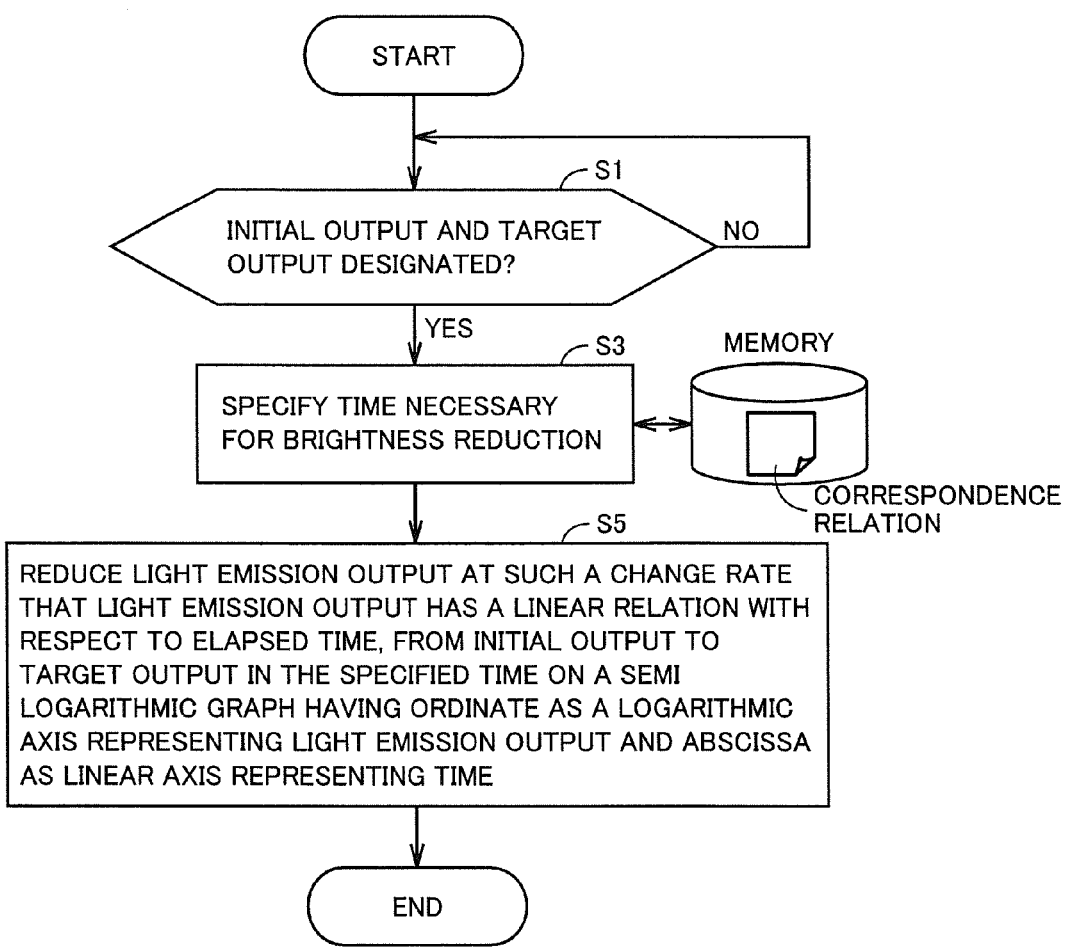
FIG. 19 is a flowchart representing a specific example of light emission output control flow when the brightness is reduced in the lighting device.

FIG. 19 is a flowchart representing a specific example of a flow of light emission output control at the time of brightness reduction in lighting device 1. The control represented by the flowchart of FIG. 19 is realized by CPU 22 reading and executing a program stored in memory 29.

The brightness reduction control may be executed automatically upon reception of an input designating initial output $E_1$, provided that lighting device 1 is set to operate in the right reduction mode in accordance with the brightness reduction control. Alternatively, by way of example, the control may be executed automatically upon reception of inputs designating initial output $E_1$ and target output $E_2$. FIG. 19 shows a flow of emission light output control in accordance with the latter example.

Specifically, referring to FIG. 19, if inputs designating initial output $E_1$ and target output $E_2$ are received at signal receiving unit 25 or SW input unit 26 (YES at step S1), at step S3, CPU 22 specifies the time t necessary for reducing brightness from output $E_1$ to output $E_2$, from the designated initial output $E_1$ and the designated target output $E_2$. If the brightness reduction control is in accordance with the former example described above, at step S3, CPU 22 calculates the target output $E_2$ from the designated initial output $E_1$ and thereafter specifies the time t.

Lighting device 1 in accordance with the present embodiment stores the correspondence relations such as shown in FIG. 18 in memory 29, in order to realize the above-described light emission output control. Therefore, at step S3, CPU 22 specifies the time t by reading the time t corresponding to the initial output $E_1$ and target output $E_2$ from the correspondence relations stored in memory 29.

The light emission output control described above is not limited to the control realizing continuous, linear output, and it encompasses output control of stepwise switching, in which the light is emitted to attain an output on a point passing over a curve representing brightness reduction in semi logarithmic scale at every constant short period of time. Specifically, the control may include stepwise dimming with each step taken in a very short time period. Thus, the "linear relation" here covers stepwise output control with very short time intervals. Since human visual sensitivity becomes higher as the target illuminance $E_2$ comes closer, the time interval becomes shorter as the target illuminance $E_2$ comes closer. Specifically, as the target illuminance $E_2$ comes closer, the output should more exactly assume the point on the above-described curve.

At step S5, CPU 22 outputs to PWM control circuit 23 such a control signal that reduces the light emission output at such a change rate that realizes a linear relation between the light emission output and the elapsed time, from initial output $E_1$ to target output $E_2$ in time t, on a semi logarithmic graph plotting the emission light output on the ordinate as a logarithmic axis and plotting time on the abscissa as a linear axis.

Alternatively, or as another example, memory 29 may store correspondence relations such as shown in FIG. 17, in which the time t necessary for brightness reduction is defined in advance for each combination of initial output $E_1$ and target output $E_2$. Here again, if inputs designating initial output $E_1$ and target output $E_2$, or an input designating initial output $E_1$ is received at signal receiving unit 25 or SW input unit 26, at step S3, CPU 22 reads and specifies the time t necessary for brightness reduction from output $E_1$ to output $E_2$, with reference to the correspondence relations such as shown in FIG. 17, from the designated initial output $E_1$ and the target output $E_2$ as designated (or calculated from designated initial output $E_1$). At step S5, CPU 22 reduces the light emission output at such a change rate that realizes a linear relation between the light emission output and the elapsed time, from initial output $E_1$ to target output $E_2$ in time t, on a semi logarithmic graph plotting the emission light output on the ordinate as a logarithmic axis and plotting time on the abscissa as a linear axis.

The description of statistical processing of the experimental results described above is directed to the statistical processing of experimental results when the illuminance is controlled with respect to emission output control, and the foregoing represents control of illuminance as the light emission output based on the description. It is noted, however, that similar experiments were conducted on color temperature and, therefore, similar control is possible based on the correspondence relations similar to FIGS. 17 and 18 obtained by statistical processing of the experimental results similar to that of illuminance.

<Another Example>

In the example above, it is assumed that the correspondence relations as represented by FIG. 17 or 18 are stored in memory 29 and used. The stored correspondence relation is not limited to a table representing correspondence such as shown in FIG. 17 or to a graph representing the correspondence such as shown in FIG. 18, and it may be an approximate expression (function) representing the time T necessary for the change in light emission output in the graph by initial output $E_1$ and target output $E_2$. This applies both to the illuminance and the color temperature as the emission light output. Here, at step S5, CPU 22 inputs initial output $E_1$ and target output $E_2$ to the function stored in memory 29, and the time T necessary for the change in light emission output is calculated accordingly.

Here, an example of calculating the approximate expression mentioned above will be described.

Figure 20:
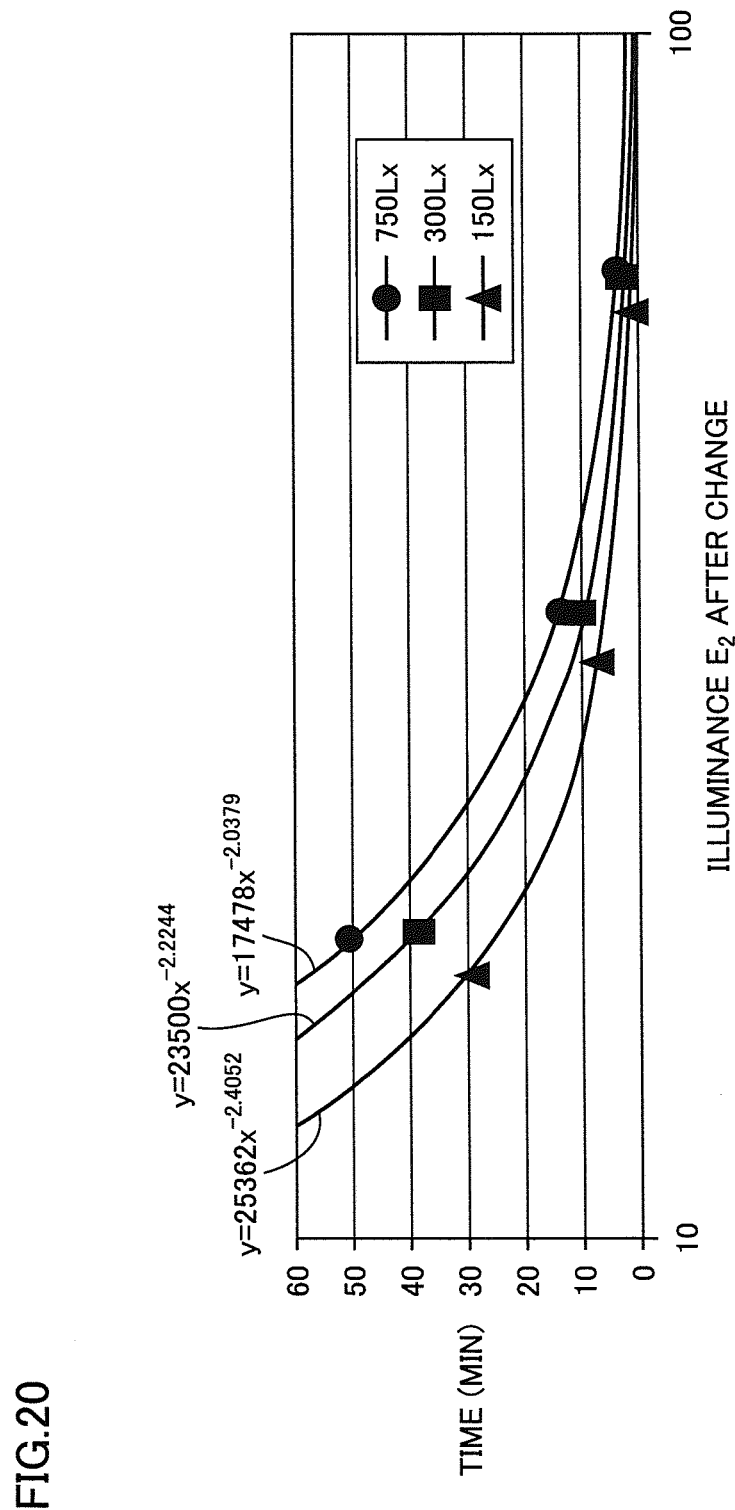
FIG. 20 is a graph representing a relation between the target output and the time necessary for changing the light emission output, for each initial output.

First, from the relation of FIG. 17, on a graph having the time on the ordinate and the illuminance on the abscissa, the relation between target output $E_2$ and the time t necessary for the change of light emission output is plotted for each initial output $E_1$. FIG. 20 is a graph representing the relation between target output $E_2$ and time t necessary for the change of light emission output for each initial output $E_1$, in which a point on FIG. 20 represents such a relation. Approximate expressions y=17478x^(−20.379), y=23500x^(−2.2244) and y=25365x^(−2.4052) in FIG. 20 are approximations in power function of target output $E_2$ and time t necessary for the change of light emission output for each initial output $E_1$ on points of FIG. 20. Specifically, it is an approximate expression of the relation in the form of $T=AE_2{}^B$.

Figure 22:
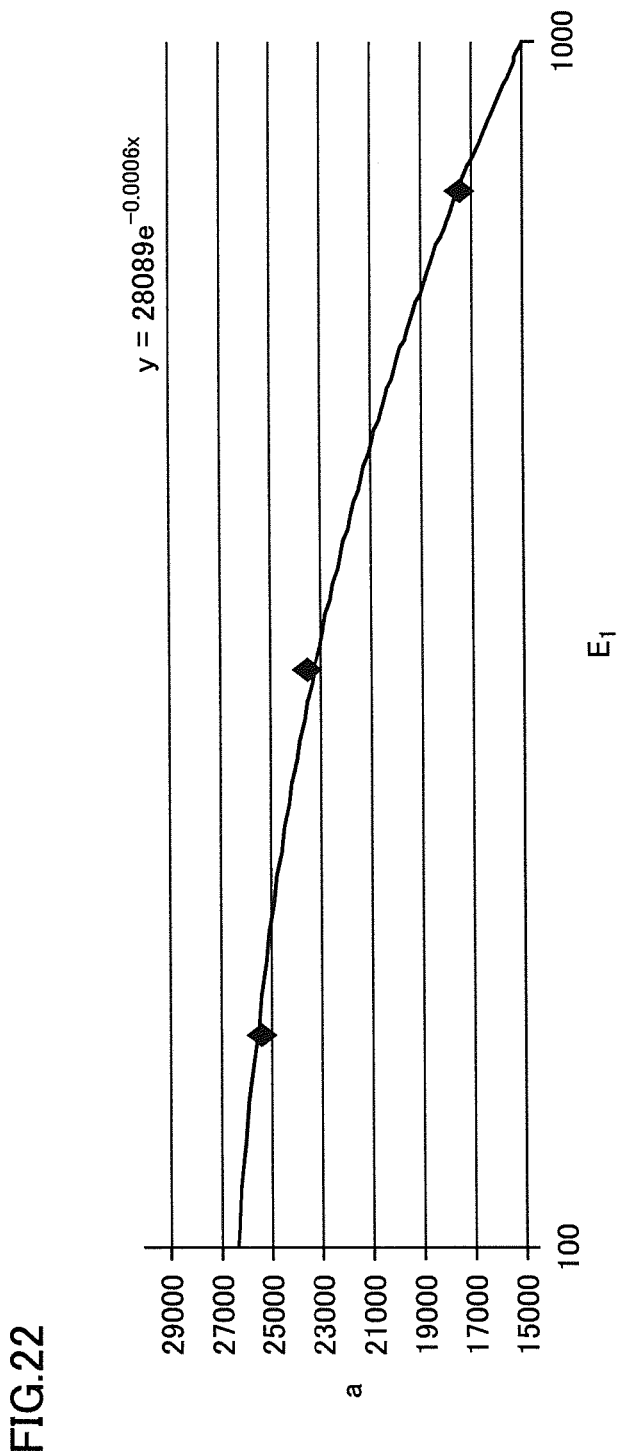
FIG. 22 shows a relation between the initial output and the variable A.

Combinations between the variables A and (−B) for each initial output $E_1$ are as shown in FIG. 21. Further, FIG. 22 represents the relation between initial output $E_1$ and variable A. From FIG. 22, approximate expression y=28089e^(−0.0006x) representing the variable A in terms of initial output $E_1$ can be obtained.

Figure 23:
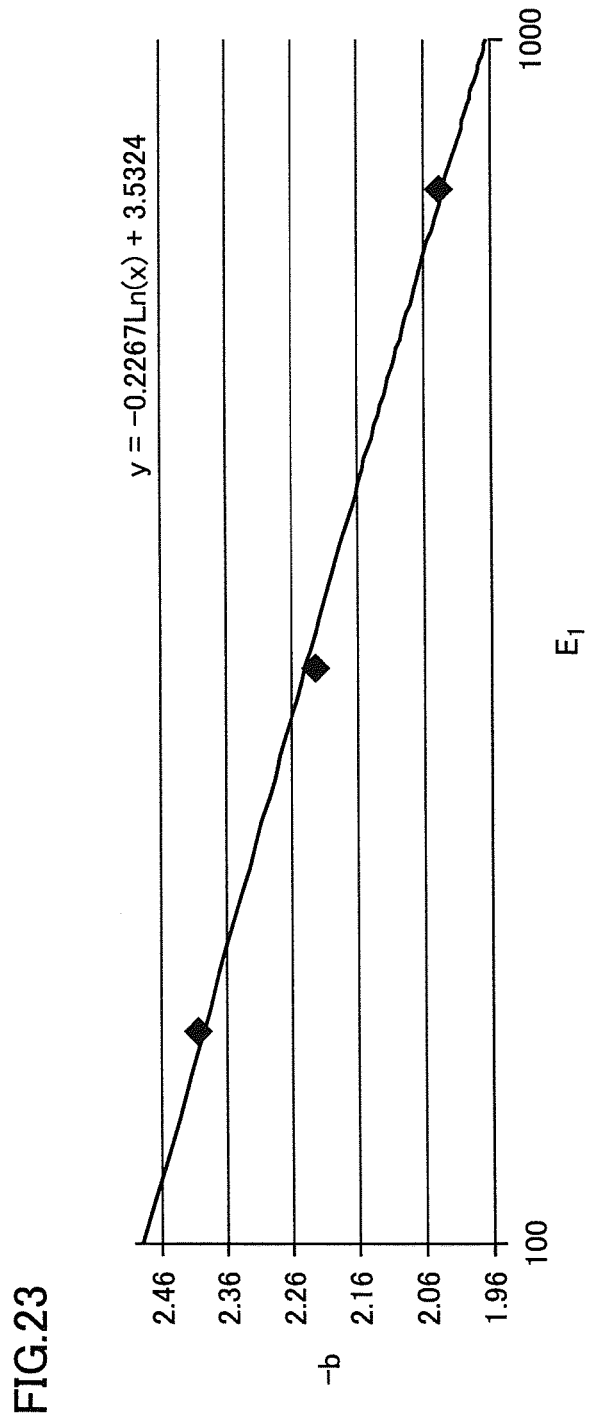
FIG. 23 is a graph representing a relation between an initial output $E_1$ and the variable (−B) approximated by an approximate expression $B=q \cdot \ln E_1+n$.
Figure 24:
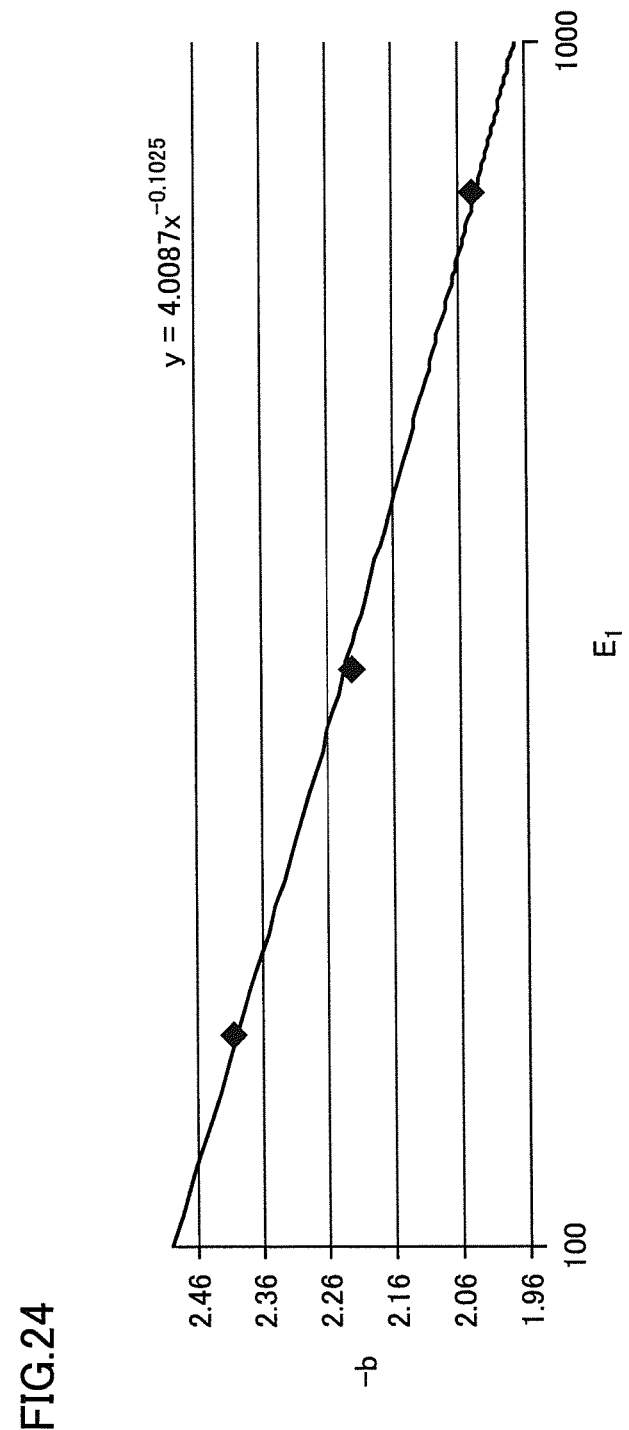
FIG. 24 is a graph representing a relation between an initial output $E_1$ and the variable (−B) approximated by an approximate expression $B=q' \cdot E_1\hat{\ }n'$.

When each point on FIG. 20 is approximated by an exponential function having initial output $E_1$ as a variable and Napier's constant e as the base, the variable A can be represented by a function having initial output $E_1$ as a variable. FIGS. 23 and 24 both represent relations between initial output $E_1$ and the variable (−B). FIG. 23 is a graph representing the relation approximated by expression B=q·ln $E_1$+n, and from FIG. 23, an approximate expression y=−0.2267 ln(x)+3.5324 is obtained as the relation. FIG. 24 is a graph representing the relation approximated by expression B=q'·$E_1$^n', and from FIG. 24, an approximate expression y=4.0087x^(−0.1025) is obtained as the relation.

From the above-described calculations, by inputting the relation obtained by FIG. 22 and the relation obtained by FIG. 23 or the relation obtained by FIG. 24 to the approximate expression given as T=A$E_2$^B, an approximate expression representing the time T necessary for the change of light emission output by initial output $E_1$ and target output $E_2$ can be obtained.

Figure 25:
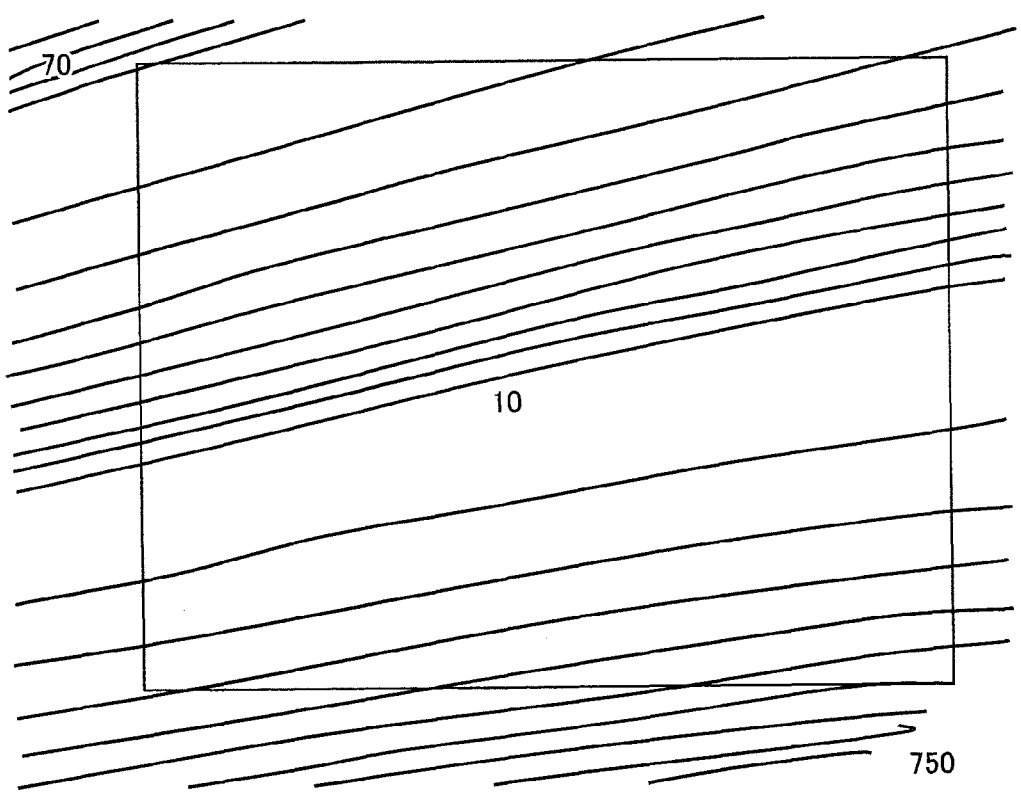
FIG. 25 represents contour lines drawn based on an approximate expression representing time T necessary for the change of light emission output by the initial output $E_1$ and the target output $E_2$, obtained by inputting the approximate expression obtained from the graph of FIG. 23 or the approximate expression obtained from the graph of FIG. 24, respectively, to the approximate expression of FIG. 20.

Coefficients k, m, q, n, q' and n' above are values determined by the number of people who can accept. Specifically, in the present example, the values are calculated using the approximate expressions using the values $E_1$, $E_2$ and T derived from experimentally obtained statistical values where 80% of participants considered the results acceptable and 20% unacceptable. Therefore, all these coefficients can be defined by determining a condition as to which extent or ratio of participants can accept (or cannot accept). In the present example, the coefficients k, m, q, n, q' and n' above are calculated to be 28089, −0.00062, 0.227, −3.5324, −4.0087 and −0.102, respectively. FIG. 25 shows contour lines drawn based on these expressions.

In the present example, experiments were conducted using the situation acceptable to 80% of participants as the ratio of people who can accept, and the approximate expressions are calculated. The ratio of people who can accept is naturally not limited to 80%, and the approximate expressions may be calculated using a different ratio such as 70% or 90%.

According to the method of calculation described above, the time T necessary for the change of light emission output will have two values, that is, T1=k·exp(m$E_1$)·$E_2$^(q·ln $E_1$+n) obtained by inputting the relation of FIG. 23 and T2=k·exp(m$E_1$)·$E_2$^(q'$E_1$n') obtained by inputting the relation of FIG. 24. Either one of these values may be used as the time T necessary for the change of light emission output. Considering the difference from the time T it took for the change of light emission output shown in FIG. 17, use of the value T1 is preferred. The reason is as follows. From the actual measurement of difference between the time T necessary for the change of light emission output shown in FIG. 17 and each of T1 and T2, it was confirmed that T-T1 is almost devoid of error. Since variable A in the approximate expression using T1 is represented as an exp function, preferably, variable (−B) is also used represented in logarithm natural Ln.

In the foregoing, as another example, an example has been described in which CPU 22 inputs initial output $E_1$ and target output $E_2$ to the function stored in memory 29 for calculation. Alternatively, an input or inputs designating initial output $E_1$ and target output $E_2$ may be received and the value T may be calculated by inputting the received values $E_1$ and $E_2$ to the function described above. It is also possible to store a table representing the relations among $E_1$, $E_2$ and T calculated beforehand in accordance with the function described above, in memory 29.

<Description of the Second Experiment>

In order to obtain the correspondence relation between the initial amount of light emission and the target amount of light emission stored in memory 29 and the time necessary for changing the amount of light from the initial amount of light emission to the target amount of light emission, the inventors conducted a second experiment. Therefore, the second experiment will be described. In the second experiment focused on the change in color temperature, the color temperature was changed at various change rate and the participants were requested to evaluate the degree of acceptability. From the results of experiment, the inventors have found the correspondence relation among the initial color temperature $Tc_1$, the target color temperature $Tc_2$ and time t necessary for changing the color temperature from the initial color temperature $Tc_1$ to the target color temperature $Tc_2$ that can attain a prescribed acceptance ratio.

FIG. 26 shows lighting conditions in the second experiment. Referring to FIG. 26, in the second experiment, initial illuminance $E_1$ was set to five different values of 30 [lx], 140 [lx], 280 [lx], 680 [lx] and 1100 [lx], and initial color temperature was set to three different values of about 3000 [K], 4100 [k] and 5700 [K]. These illuminances are used as representative values in the second experiment. The rate (dimming rate) STc(=|log($Tc_1$)=|log($Tc_2$)|/t) at which the color temperature $Tc_1$ is changed to the target color temperature $Tc_2$ in time t is set to 6 values from 0.015 [K/min] to ∞ [K/min], and the change rate ($Tc_2$/$Tc_1$) from the initial color temperature to the target color temperature was set to 19 different values from 0.48 to 1.9.

It is noted that the experiment with the dimming rate STc=∞ [K/min] represents an experiment of instantaneous change in which the initial color temperature $Tc_2$ was instantaneously (t≈0) changed to the target color temperature $Tc_2$. This experiment was conducted as "Instantaneous Change Experiment" on 14 college-age female participants, with condition of initial illuminance $E_1$ set to 140 [lx], 280 [lx] and 1100 [lx]. Details are shown in FIG. 27 listing lighting conditions of "Instantaneous Change Experiment."

Referring to FIG. 27, the "Instantaneous Change Experiment" was started from the state of initial illuminance $E_1$ of 140 [lx] and initial color temperature $Tc_1$ of 3000 [K], the state of initial illuminance $E_1$ of 280 [lx] and initial color temperature $Tc_1$ of 4100 [K], and the state of initial illuminance $E_1$ of 1100 [lx] and initial color temperature $Tc_1$ of 5700 [K], and while fixing the illuminance at the initial illuminance $E_1$, the color temperature was instantaneously changed to the target color temperature $Tc_2$, at the color temperature change rate of 0.8, 0.88, 0.931, 0,959, 0.986, 1.027, 1.045, 1.073, 1.12 and 1.20, respectively. After each experiment, the participants evaluated the acceptability of change in 5 levels, that is, "(the change in color temperature is) unacceptable," "hardly acceptable," "barely acceptable," "fairly acceptable" and "acceptable."

The experiment with the dimming rate St≠∞ [K/min] represents not an instantaneous change but temporal change experiment in which the color temperature is changed over a certain time period t. The experiment was conducted as "Temporal Change Experiment 1" on 30 college-age female participants and as "Temporal Change Experiment 2" on 8 college-age female participants. Specifically, the inventors conducted "Temporal Change Experiment 1" with smaller number of lighting conditions on a relatively large number of participants to confirm results to some extent and, thereafter, conducted "Temporal Change Experiment 2" with a larger number of lighting conditions on a smaller number of participants than in "Temporal Change Experiment 1." FIGS. 28A and 28B represent lighting conditions for "Temporal Change Experiments," in which FIG. 28A represents lighting conditions for "Temporal Change Experiment 1" and FIG. 28B represents lighting conditions for "Temporal Change Experiment 2."

Specifically, referring to FIG. 28A, as "Temporal Change Experiment 1," an experiment of changing from initial color temperature $Tc_1$ of 5700 [K] to target color temperature $Tc_2$ of 4000 [K] at dimming rate STc of 0.063 [K/min] with the initial illuminance $E_1$ of 300 [lx] fixed was conducted three times; experiments of changing from initial color temperature $Tc_1$ of 5700 [K] to target color temperature $Tc_2$ of 3000 [K] at three different dimming rates STc of 0.063 [K/min], 0.032

[K/min] and 0.015 [K/min] with the initial illuminance $E_1$ of 300 [lx] fixed were conducted; and experiments of changing from initial color temperature $Tc_1$ of 5700 [K] to target color temperature $Tc_2$ of 2700 [K] at three different dimming rates STc of 0.063 [K/min], 0.032 [K/min] and 0.015 [K/min] with the initial illuminance $E_1$ of 300 [lx] fixed were conducted. After each experiment, the participants provided the aforementioned evaluation of 5 levels regarding the acceptability of change, as the evaluation of time-fluctuation in light color.

As to "Temporal Change Experiment 2," similar experiments were conducted as shown in FIG. 28B, and after each experiment, the participants provided the aforementioned evaluation of 5 levels regarding the acceptability of change, as the evaluation of time-fluctuation in light color.

FIGS. 29A to 31C represent the ratio of the number of participants (accumulative declaration rate %) who answered "unacceptable" and "hardly acceptable" among the participants as a whole under each lighting condition, collectively for "Instantaneous Change Experiment," "Temporal Change Experiment 1," and "Temporal Change Experiment 2."

Figure 29A:
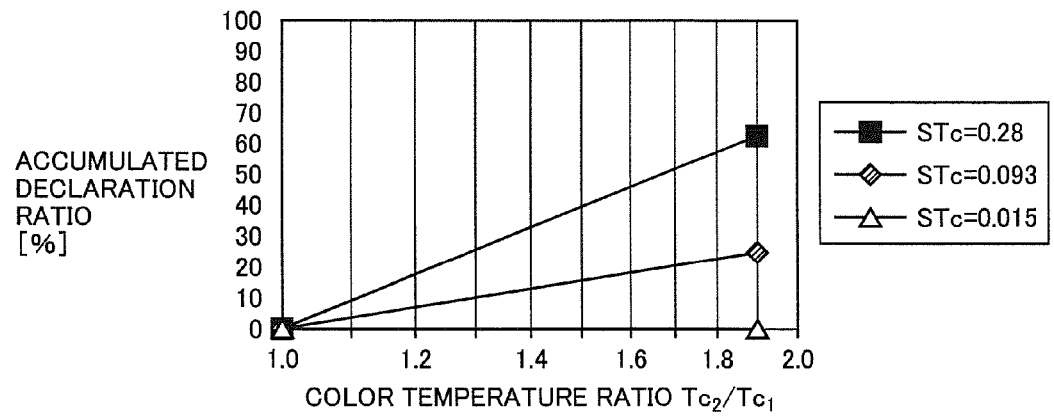
FIG. 29A shows results of the second experiment when an initial color temperature $Tc_1=3000$ [K] is changed to a target color temperature, with initial illuminance kept constant at $E_1=30$ [lx].
Figure 29B:
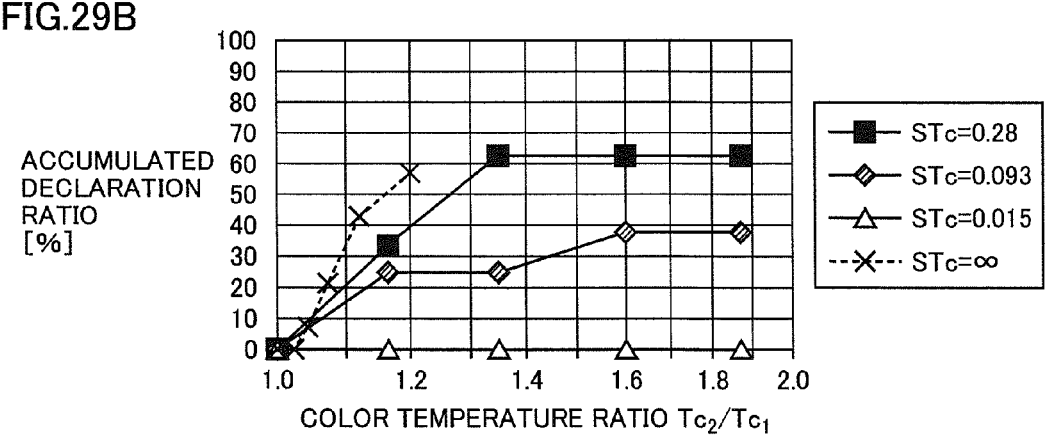
FIG. 29B shows results of the second experiment when an initial color temperature $Tc_1=3000$ [K] is changed to a target color temperature, with initial illuminance kept constant at $E_1=300$ [lx].
Figure 29C:
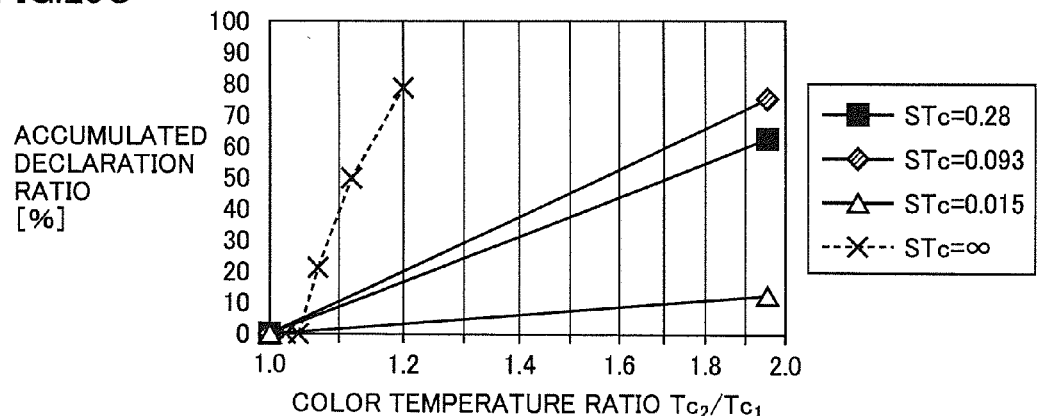
FIG. 29C shows results of the second experiment when an initial color temperature $Tc_1=3000$ [K] is changed to a target color temperature, with initial illuminance kept constant at $E_1=1100$ [lx].

Specifically, FIGS. 29A to 29C represent results of experiments when the color temperature was changed from initial color temperature $Tc_1=3000$ [K] to target color temperature $Tc_2$, wherein FIG. 29A shows the accumulative declaration rate of the answers above for each dimming rate STc when the color temperature was changed with initial illuminance fixed at $E_1=30$ [lx], FIG. 29B shows the accumulative declaration rate of the answers above for each dimming rate STc when the color temperature was changed with initial illuminance fixed at $E_1=300$ [lx], and FIG. 29C shows the accumulative declaration rate of the answers above for each dimming rate STc when the color temperature was changed with initial illuminance fixed at $E_1=1100$ [lx].

Figure 30A:
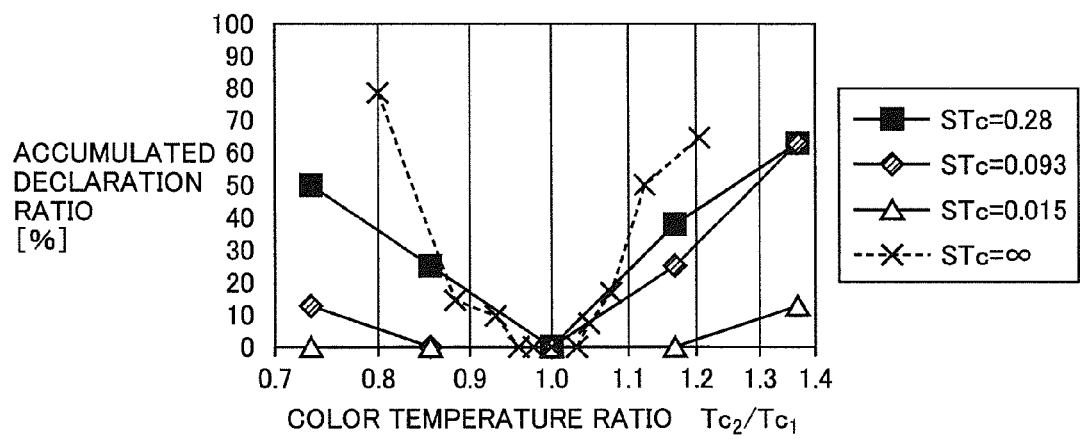
FIG. 30A shows results of the second experiment when an initial color temperature $Tc_1=4100$ [K] is changed to a target color temperature, with initial illuminance kept constant at $E_1=300$ [lx].
Figure 30B:
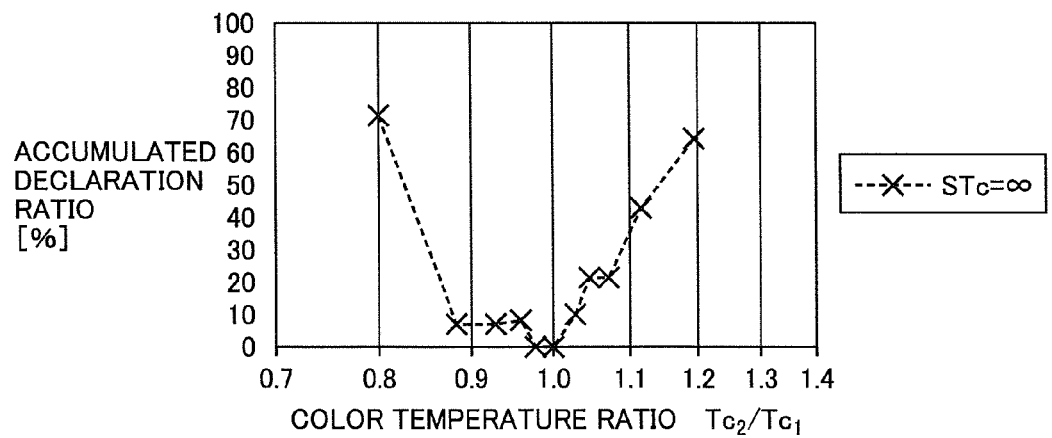
FIG. 30B shows results of the second experiment when an initial color temperature $Tc_1=4100$ [K] is changed to a target color temperature, with initial illuminance kept constant at $E_1=1100$ [lx].

Similarly, FIGS. 30A and 30B represent results of experiments when the color temperature was changed from initial color temperature $Tc_1=4100$ [K] to target color temperature $Tc_2$, wherein FIG. 30A shows the accumulative declaration rate of the answers above for each dimming rate STc when the color temperature was changed with initial illuminance fixed at $E_1=300$ [lx], and FIG. 30B shows the accumulative declaration rate of the answers above for each dimming rate STc when the color temperature was changed with initial illuminance fixed at $E_1=1100$ [lx].

Figure 31A:
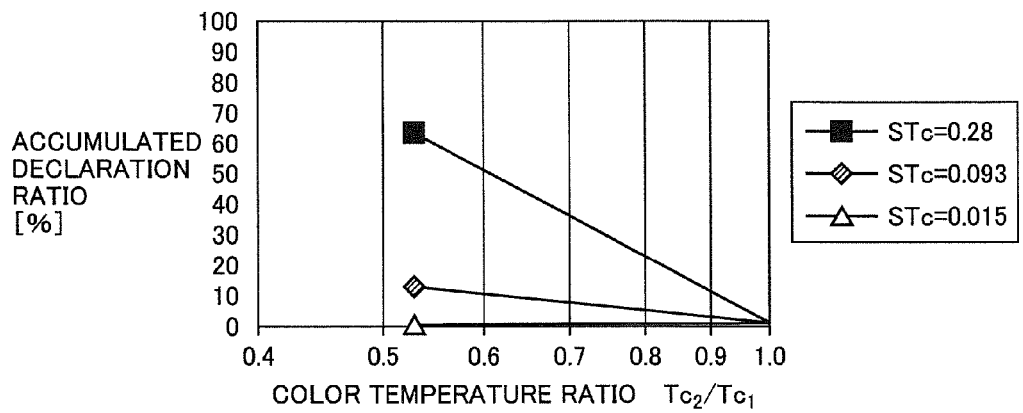
FIG. 31A shows results of the second experiment when an initial color temperature $Tc_1=5700$ [K] is changed to a target color temperature, with initial illuminance kept constant at $E_1=30$ [lx].
Figure 31B:
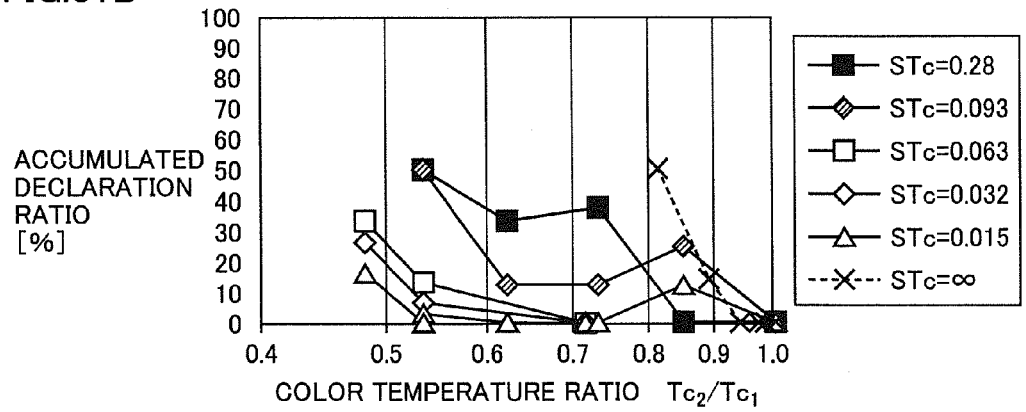
FIG. 31B shows results of the second experiment when an initial color temperature $Tc_1=5700$ [K] is changed to a target color temperature, with initial illuminance kept constant at $E_1=300$ [lx].
Figure 31C:
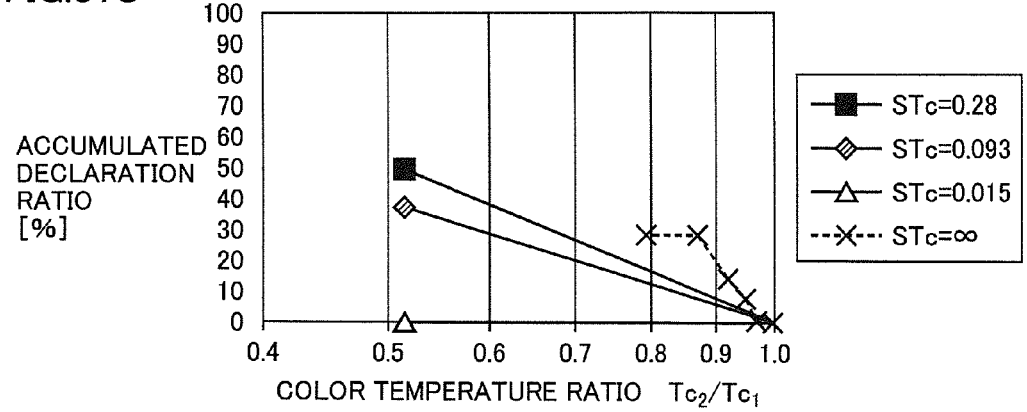
FIG. 31C shows results of the second experiment when an initial color temperature $Tc_1=5700$ [K] is changed to a target color temperature, with initial illuminance kept constant at $E_1=1100$ [lx].

FIGS. 31A to 31C represent results of experiments when the color temperature was changed from initial color temperature $Tc_1=5700$ [K] to target color temperature $Tc_2$, wherein FIG. 31A shows the accumulative declaration rate of the answers above for each dimming rate STc when the color temperature was changed with initial illuminance fixed at $E_1=30$ [lx], FIG. 31B shows the accumulative declaration rate of the answers above for each dimming rate STc when the color temperature was changed with initial illuminance fixed at $E_1=300$ [lx], and FIG. 31C shows the accumulative declaration rate of the answers above for each dimming rate STc when the color temperature was changed with initial illuminance fixed at $E_1=1100$ [lx].

Based on the results of experiments, the inventors considered the experimental condition under which 80% of participants answered that the change was acceptable (80% acceptance ratio), that is, the condition with accumulative declaration rate of 20%, to be a recommended value of change. Specifically, from the results of experiments shown in FIGS. 29A to 31C, it can be seen that in the experiment of increasing color temperature, the accumulative declaration rate saying that the change is unacceptable tends to be higher when initial illuminance $E_1$ is higher. On the other hand, in the instantaneous change experiment, under the lighting condition of lowering the color temperature from initial color temperature of $Tc_1=4100$ [K], the tendency is reversed around dimming rate of STc=0.28 [K/min] as a boundary. Therefore, though there is a tendency that the accumulative declaration rate declaring the change unacceptable is generally higher when the initial illuminance $E_1$ is higher, the tendency is not very dominant. Therefore, the inventors analyzed the results of present experiments in an integrated manner for all illuminances without considering the difference in initial illuminance $E_1$, and found the correspondence relation among the initial color temperature $Tc_1$ and target color temperature $Tc_2$ attaining the acceptance ratio of 80% and the time t necessary for changing the color temperature from initial color temperature $Tc_1$ to target color temperature $Tc_2$.

Figure 32:
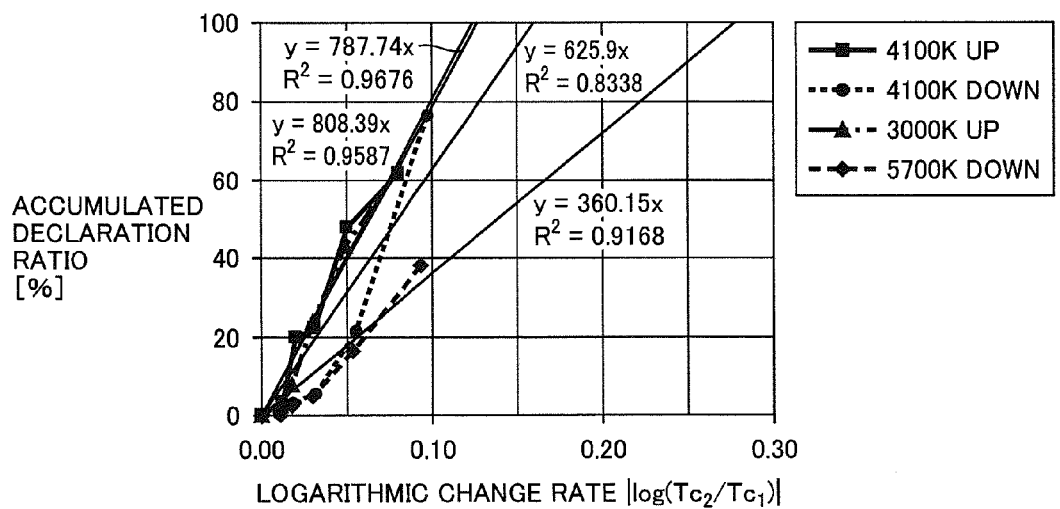
FIG. 32 shows results of instantaneous change experiment with dimming rate of $STc=\infty$ [K/min], of the second experiment.
Figure 33:
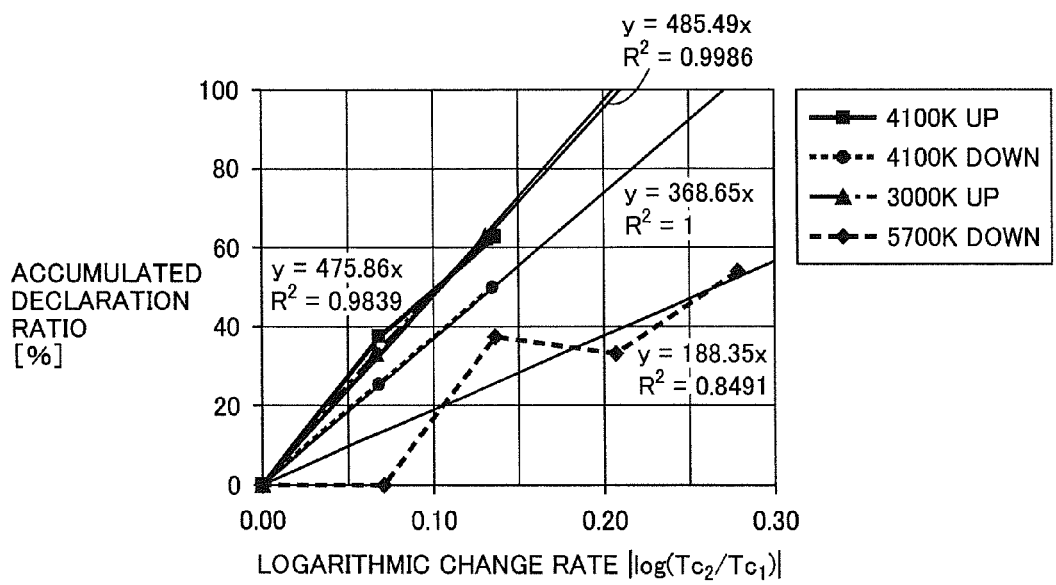
FIG. 33 shows results of temporal change experiment with dimming rate of $STc=0.279$ [K/min], of the second experiment.
Figure 34:
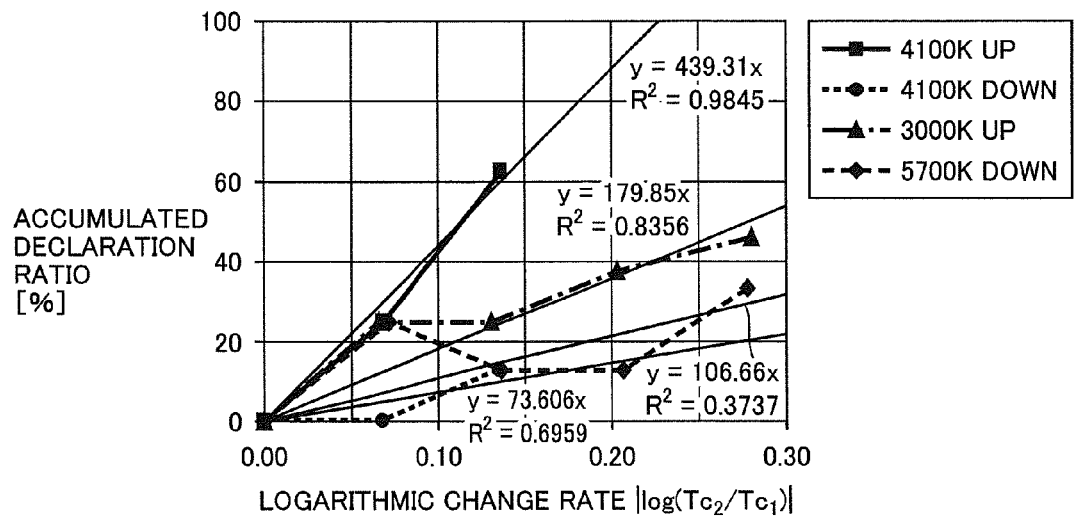
FIG. 34 shows results of temporal change experiment with dimming rate of $STc=0.093$ [K/min], of the second experiment.
Figure 35:
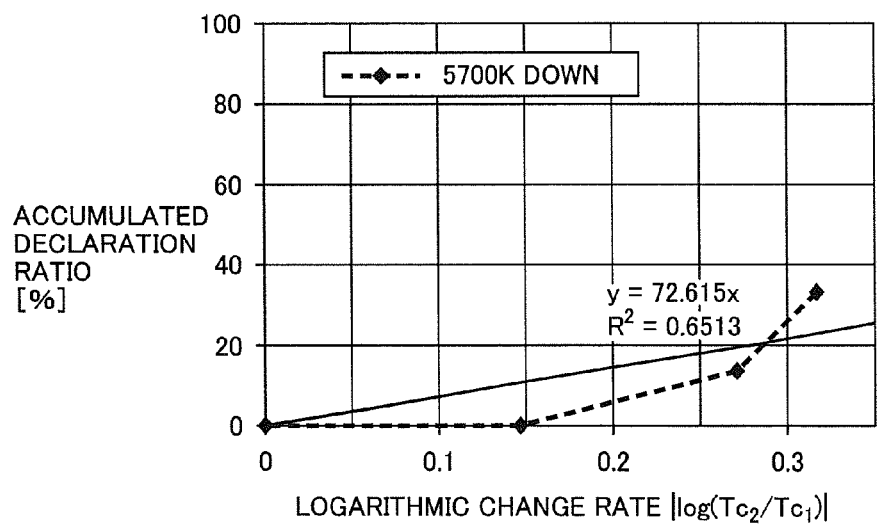
FIG. 35 shows results of temporal change experiment with dimming rate of $STc=0.063$ [K/min], of the second experiment.
Figure 36:
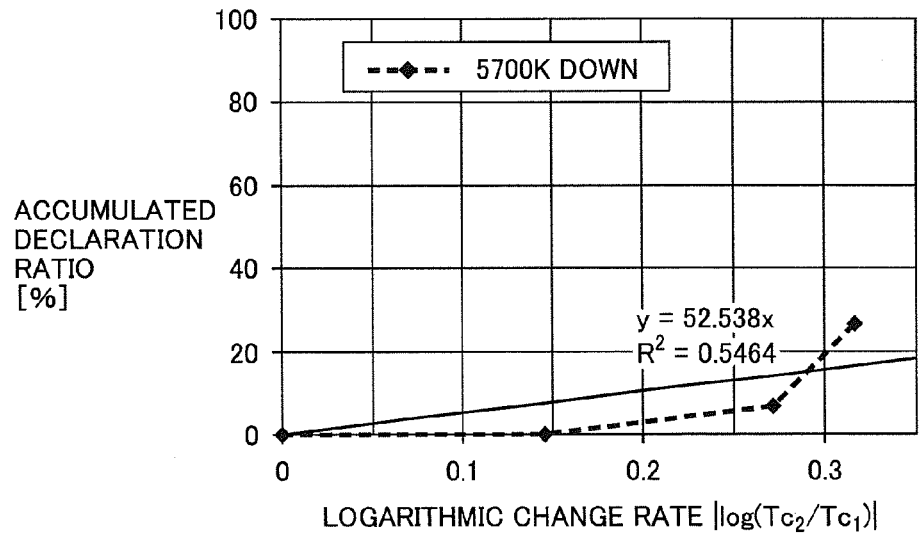
FIG. 36 shows results of temporal change experiment with dimming rate of $STc=0.032$ [K/min], of the second experiment.
Figure 37:
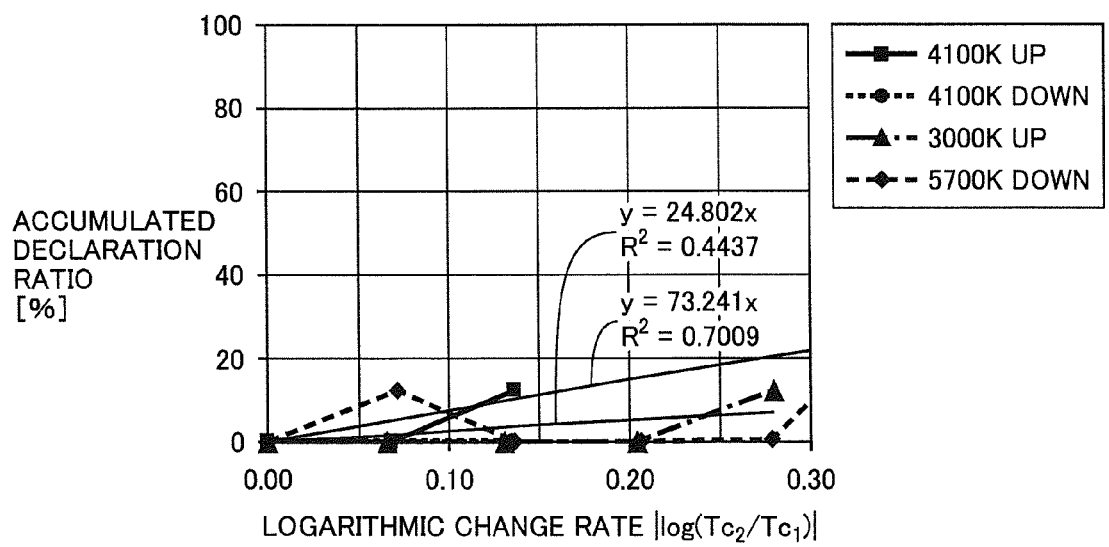
FIG. 37 shows results of temporal change experiment with dimming rate of $STc=0.014$ [K/min], of the second experiment.

FIGS. 32 to 37 represent the accumulative declaration rate % of the answers "unacceptable" or "hardly acceptable" for each change of color temperature, for each dimming rate STc. The ordinate represents the accumulative declaration rate, and the abscissa represents the absolute value of logarithmic rate of change ($|\log(Tc_2/Tc_1)|$) of color temperature. FIG. 32 shows the result of instantaneous change experiment with dimming rate STc=∞ [K/min], and the following figures show the result of temporal change experiments, with diming rate STc=∞0.279 [K/min] in FIG. 33, diming rate STc=0.093 [K/min] in FIG. 34, diming rate STc=0.063 [K/min] in FIG. 35, diming rate STc=0.032 [K/min] in FIG. 36, and diming rate STc=0.014 [K/min] in FIG. 37. In these graphs, "4100K UP" represents a lighting condition in which the color temperature is increased from $Tc_1=4100$ [K] to target color temperature $Tc_2$, and "4100K DOWN" represents a lighting condition in which the color temperature is decreased from $Tc_1=4100$ [K] to target color temperature $Tc_2$. The same applies to other captions.

The inventors plotted the results of experiments for each dimming rate STc in accordance with the initial color temperature $Tc_1$ and the relation between the initial color temperature $Tc_1$ and the target color temperature $Tc_2$ (increase or decrease), on the graphs having the ordinate and abscissa as described above, in FIGS. 32 to 37.

From the comparison of these results, it can be seen that regardless of the dimming rate, the ratio of participants who answered the color temperature acceptable tends to be smaller when the direction of change in color temperature was increasing (to the whiter side) than decreasing (to redder side). Specifically, acceptance ratio is higher when the change rate ($Tc_2/Tc_1$) of color temperature is smaller than 1.0, than when it is equal to or higher than 1.0.

Further, it can be seen that when the color temperature changes in the increasing direction from initial color temperature $Tc_1$, the ratio of participants who answered the color temperature acceptable tends to be smaller when the initial color temperature $Tc_1$ is higher. By way of example, the accumulative declaration rate of unacceptability at initial color temperature of $Tc_1=4100$ [K] is higher than the accumulative declaration rate of unacceptability at initial color temperature of $Tc_1=3000$ [K].

On the other hand, it can be seen that when the color temperature changes in the decreasing direction from initial color temperature $Tc_1$, the ratio of participants who answered the color temperature acceptable tends to be smaller when the initial color temperature $Tc_1$ is lower, if the dimming rate STc is faster (for example, STc=∞, 0.28 [K/min]). For example, the accumulative declaration rate of unacceptability is higher when initial color temperature $Tc_1=4100$ [K] than when initial color temperature $Tc_1=5700$ [K], regardless of the dimming rate STc.

Considering the results of experiments, the inventors decided to analyze the results of experiments incorporating initial color temperature $Tc_1$ and the direction of change from the initial color temperature $Tc_1$ as influential variables. Further, since it is much influenced by the accumulative declaration rate of unacceptability at the dimming rate STc with low regression line for the entire results of experiments, the results of experiments with initial color temperature $Tc_1$ of 5700 [K], which were not distinctively different at the dimming rate STc of 0.093 [K/min] or smaller (STc≤0.093) were applied to the results of experiments with 4100 [K], for the change in decreasing direction from initial color temperature $Tc_1$.

Based on the above-described principle of analysis, the inventors have found regression lines from the plotted results of experiments under each lighting condition. FIGS. 32 to 37 show calculated regression lines together with the results of experiments. From the expression of calculated regression line, the change rate of color temperature that is said to be acceptable by 80% of the participants (80% acceptance ratio), that is, the change rate of color temperature obtained by inputting the accumulated declaration rate of 20% to the expression of regressive line, was calculated. Thus calculated change rate of color temperature is also referred to as "threshold color temperature change rate."

Figures 38, 39:
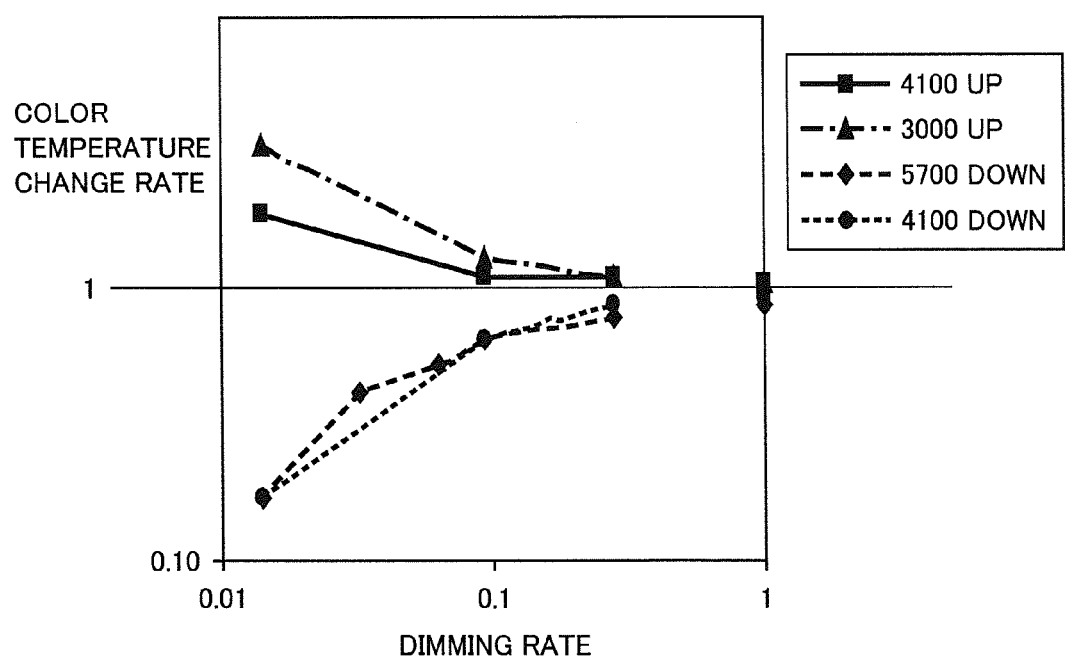
FIG. 38 shows threshold color temperature change rate for each dimming rate STc attaining 80% acceptance ratio, obtained from the results of experiments shown in FIGS. 32 to 37.
FIG. 39 is a graph plotting the dimming rate on the abscissa and the change rate of color temperature on the ordinate, representing transition of threshold color temperature change rate with respect to the dimming rate, for each initial color temperature and each direction of change from the initial color temperature.

FIG. 38 shows the threshold color temperature change rate for each dimming rate STc, attaining 80% acceptance ratio, obtained from the results of experiments shown in FIGS. 32 to 37. FIG. 39 is a graph plotting the result of FIG. 38 on which the abscissa represents dimming rate STc and the ordinate represents the change rate of color temperature, showing transition of threshold color temperature change rate with respect to dimming rate STc, for each initial color temperature $Tc_1$ and each direction of change from the initial color temperature $Tc_1$. It is noted, however, that dimming rate STc=1 [K/min] in the graph of FIG. 39 represents dimming rate STc=∞ [K/min].

Referring to FIG. 39, it can be seen that generally, the threshold color temperature change rate increases as the dimming rate STc increases, if the color temperature changes in the decreasing direction, regardless of the value of initial color temperature $Tc_1$. On the other hand, if the color temperature is increased, the threshold color temperature change rate lowers as the dimming rate STc increases, and the rate of decrease is larger if the initial color temperature $Tc_1$ is lower. Further, it can be seen that if the change takes place at the same dimming rate STc, the difference of threshold color temperature change rate from 1 becomes smaller when the direction of change is in the increasing side than in the decreasing side.

In other words, the change can be made acceptable to about 20% of the participants, if the dimming rate STc is made smaller as the change rate of color temperature is made larger, that is, if the change is made more gradual.

Further, from FIG. 39, it can be seen that when the change is in the direction to the whiter side from initial color temperature $Tc_1$, the change can be accepted by about 20% of the participants if the change is made more moderate than in the change to the redder direction.

Therefore, in order to find details of this relation, the inventors calculated, for each initial color temperature $Tc_1$, the target color temperature T2 attaining the threshold color temperature change ratio and the time t necessary for the change, from the threshold color temperature change ratio for each dimming rate STc shown in FIG. 38. FIG. 40 shows the relation between the target color temperature $Tc_2$ and the time t necessary for the change, both on the increasing and decreasing sides, for each initial color temperature $Tc_1$, which attains the 80% acceptance ratio.

Figure 41:
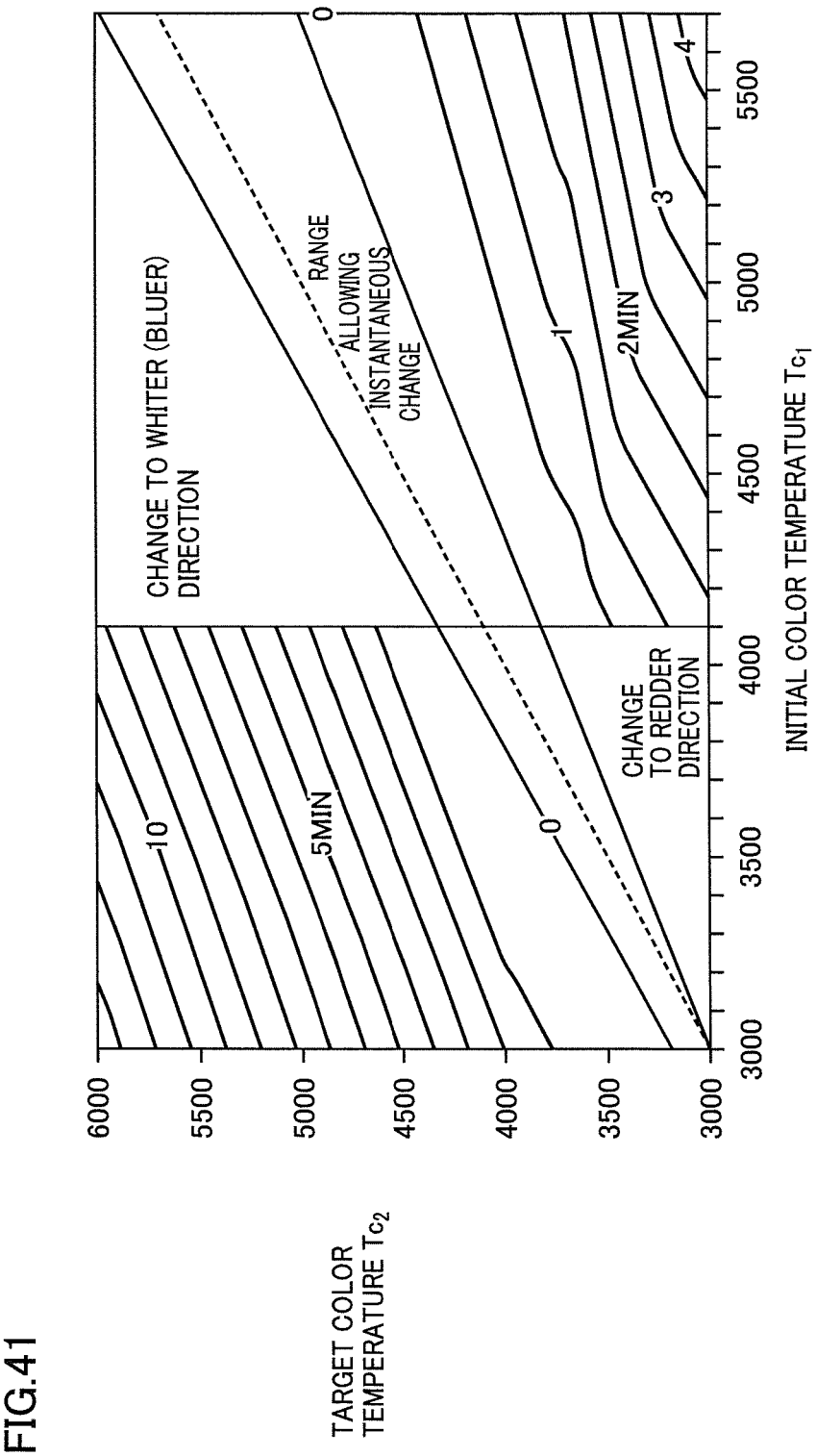
FIG. 41 shows relations of time appropriate for the change in color temperature, on the increasing side and the decreasing side, respectively, for each initial color temperature and each target temperature, obtained by forming a distribution chart from FIG. 40.

The inventors formed a distribution chart from the relations shown in FIG. 40, and obtained the relation shown in FIG. 41 as the relation of appropriate change time t on each of the increasing and decreasing sides, for each initial color temperature $Tc_1$ and the target color temperature $Tc_2$.

FIG. 41 is a graph having initial color temperature $Tc_1$ [K] on the abscissa and target color temperature $Tc_2$ [K] on the ordinate, representing a regression surface of three-dimensional distribution obtained by specifying the position of threshold color temperature change ratio on the graph and allocating to that position the time t [min] it took for the change of color temperature at that time. In the three-dimensional distribution chart of FIG. 41, the relation between the threshold color temperature change ratio and the time t appropriate for the change of color temperature is shown on the regression surface.

The accumulative declaration rate read as the threshold color temperature change ratio can appropriately be selected and, therefore, the relation is not limited to the one shown in FIG. 41. Specifically, the relation of appropriate change time t for each initial color temperature $Tc_1$ and target color temperature $Tc_2$ shown in FIG. 41 is only an example obtained as a result of experiments conducted by the inventors.

<Light Emission Output Control 2>

In the foregoing, the flow of light emission output control at the time of reducing brightness in lighting device 1 has been described with reference to FIG. 19, specifically assuming the control utilizing the results of the first experiment. If the control utilizing the results of the second experiment is to be adopted as the light emission output control in lighting device 1, the manner of control is similar to that shown in FIG. 19. In this case, by way of example, the correspondence relations shown in FIG. 41 are stored in memory 29 of lighting device 1.

When inputs of initial color temperature $Tc_1$ and target color temperature $Tc_2$ as parameters of change are received at signal receiving unit 25 or SW input unit 26, CPU 22 of lighting device 1 reads the time t corresponding to the initial color temperature $Tc_1$, the target color temperature $Tc_2$ and the direction of change (increasing side or decreasing side) from the correspondence relations stored in memory 29, and specifies the time t necessary for the change of color temperature. Then, CPU 22 outputs such a control signal that changes the light emission output at such a change rate that realizes a linear relation between the light emission output and the elapsed time, from initial color temperature $Tc_1$ to target color temperature $Tc_2$ in time t, to PWM control circuit 23.

<Another Example>

As another example, control may be performed using an approximate expression (function) representing the time t necessary for the change in color temperature of the graph derived from the results of experiments above in terms of initial color temperature $Tc_1$ and target color temperature $Tc_2$. Here, CPU 22 inputs initial color temperature $Tc_1$ and target color temperature $Tc_2$ to the function stored in memory 29, and thereby calculates the time t necessary for the change in color temperature.

An example of the method of calculating the approximate expression will be described.

Figure 42:
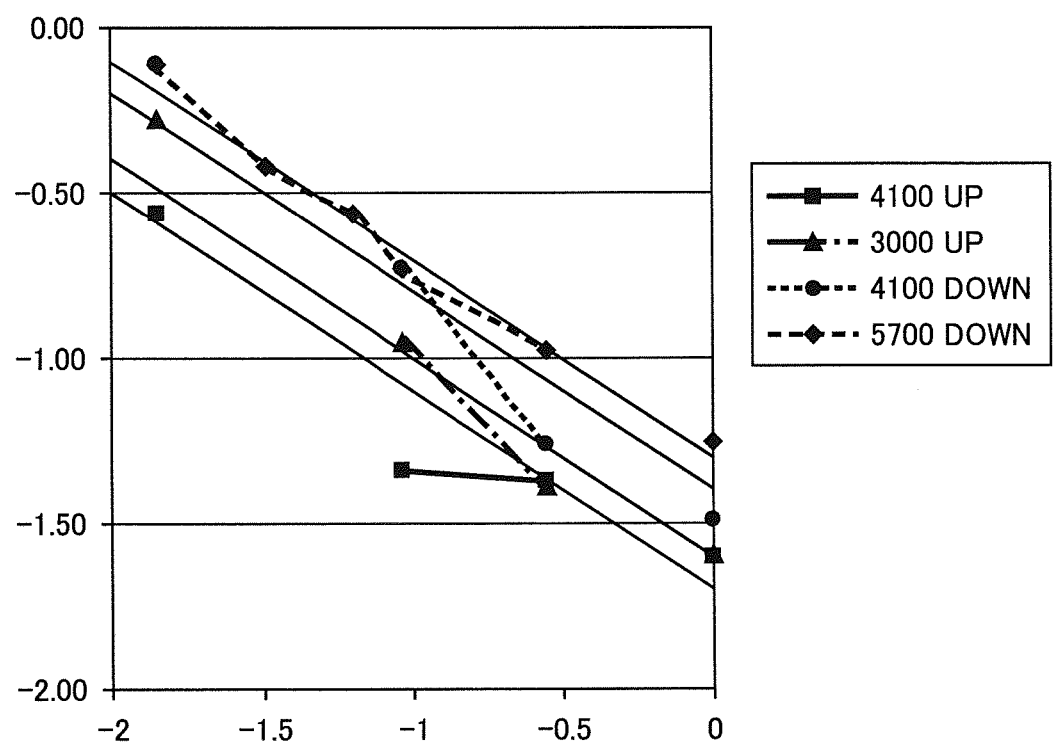
FIG. 42 is a graph plotting logarithmic change rate of color temperature on the ordinate and the dimming rate on the abscissa, representing the logarithmic change rate of color temperature attaining 80% acceptance ratio and the dimming rate for the change, with respect to the increasing and decreasing changes, respectively, for each initial color temperature shown in FIG. 40.

FIG. 42 is a graph plotting logarithmic change rate of color temperature on the ordinate and the dimming rate on the abscissa, representing the logarithmic change rate of color temperature attaining the 80% acceptance ratio and the dimming rate for the change, with respect to the increasing and decreasing sides, respectively, for each initial color temperature $Tc_1$ shown in FIG. 40.

By calculating a regression line of FIG. 42, the logarithmic change rate of color temperature (log $(Tc_2/Tc_1)$) can be approximated by an approximate expression log $(Tc_2/Tc_1)$ $=\pm A \cdot STc'$, with the color temperature increasing side represented by + and the decreasing side by −. Here, through experiments, it is known that a value −0.6, for example, corresponds to the constant v.

The coefficient A is defined by determining initial color temperature $Tc_1$ and target color temperature $Tc_2$. Specifically, for a situation in which initial color temperature $Tc_1$ and target color temperature $Tc_2$ are in such a relation that target color temperature $Tc_2$ is obtained by decreasing initial color temperature $Tc_1$ and for a situation in which initial color temperature $Tc_1$ and target color temperature $Tc_2$ are in such a relation that target color temperature $Tc_2$ is obtained by increasing initial color temperature $Tc_1$, coefficient A is calculated in the following manner:

Decreasing side: $A = a \times Tc_1 + b (A<0)$   Equation (2);

Increasing side: $A = c \times Tc_1 + d (A>0)$   Equation (3).

By way of example, the constant $a = 6.88 \times 10^{-0.6}$, the constant $b = 0.012$, the constant $c = -4.55 \times 10^{-0.6}$, and the constant $d = 0.039$ are obtained through experiments.

Thus, from initial color temperature $Tc_1$ [K], target color temperature $Tc_2$ [K], and the coefficient A determined by Equation (2) or (3) depending on whether the change of color temperature is on the decreasing side or increasing side, the dimming rate STc is calculated. Further, by inputting initial color temperature $Tc_1$ [K] and target color temperature $Tc_2$ [K] in dimming rate $STc = |\log(Tc_1) - \log(Tc_2)|/t$, the change time t can be calculated.

Figure 43:
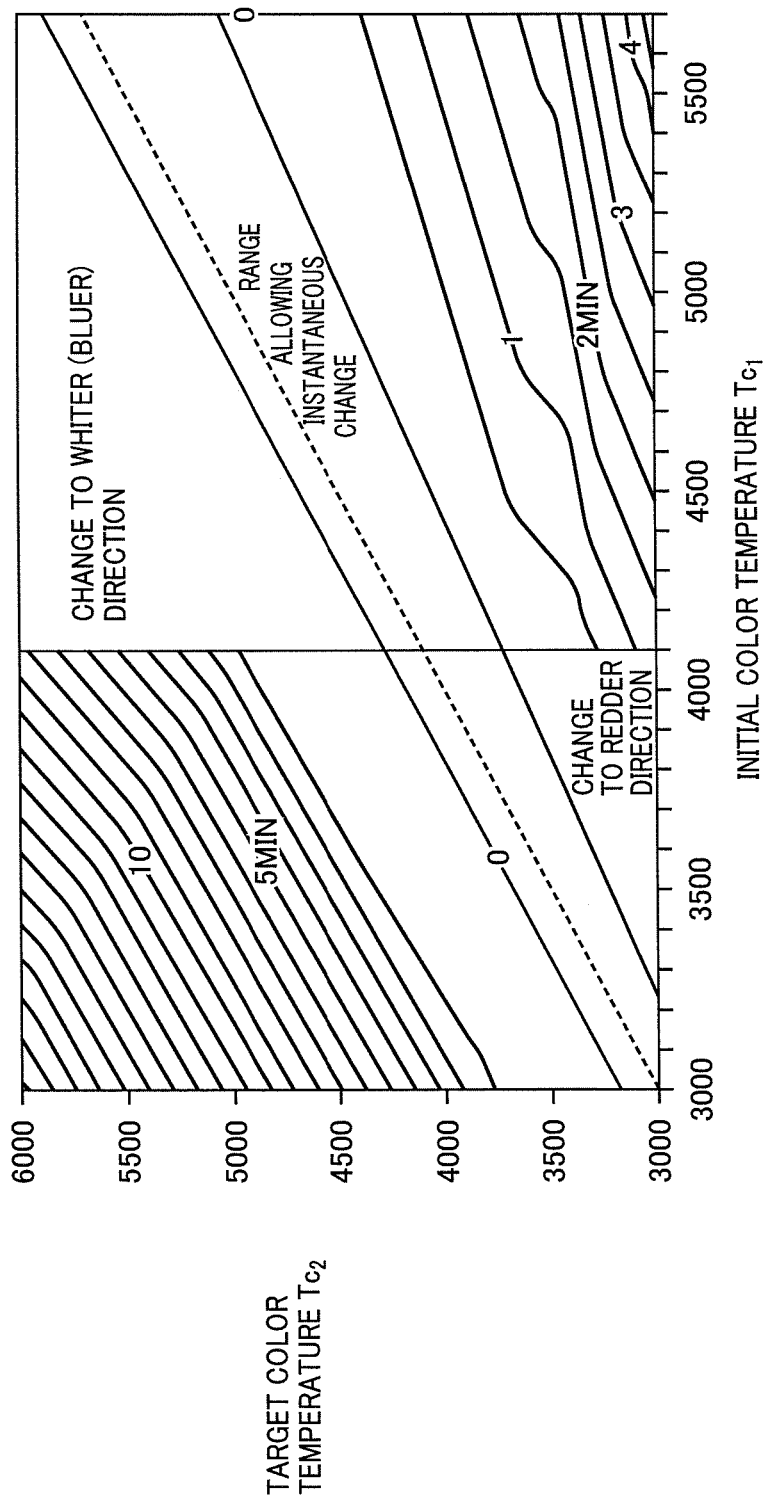
FIG. 43 shows a relation suitable for the change of color temperature, for each initial color temperature and the target color temperature, when approximated by an approximate expression $\log(Tc_2/Tc_1)$.

FIG. 43 shows a relation of time t suitable for the change of color temperature, for each initial color temperature and the target color temperature, when approximated by the above-described approximate expression $\log(Tc_2/Tc_1)$.

The inventors verified the correlation between the relation shown in FIG. 41 and the relation shown in FIG. 43.

Figure 44:
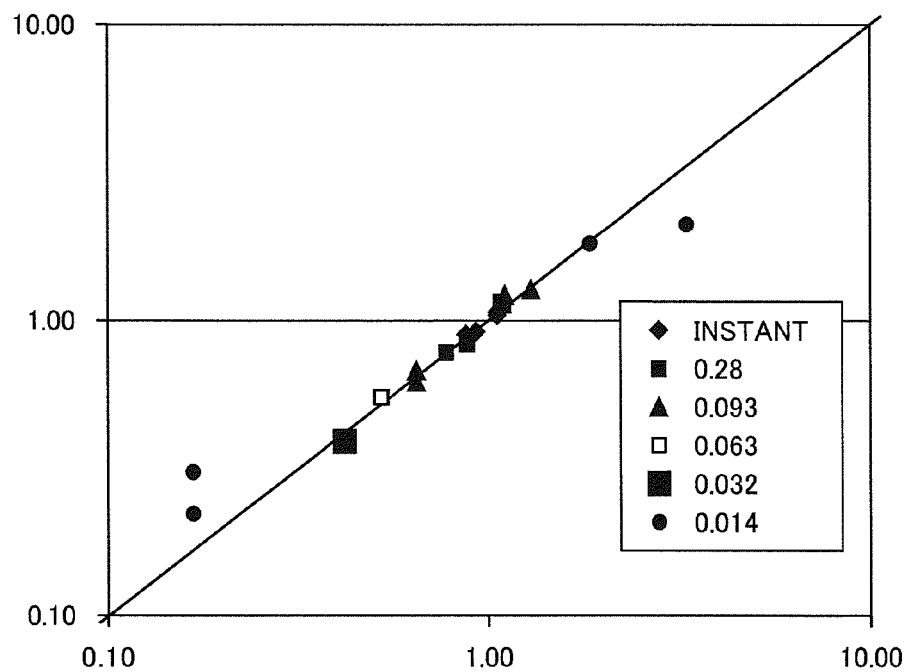
FIG. 44 shows a relation between the change rate of color temperature read from FIG. 41 and the change rate of color temperature read from FIG. 43, for each dimming rate.
Figure 45:
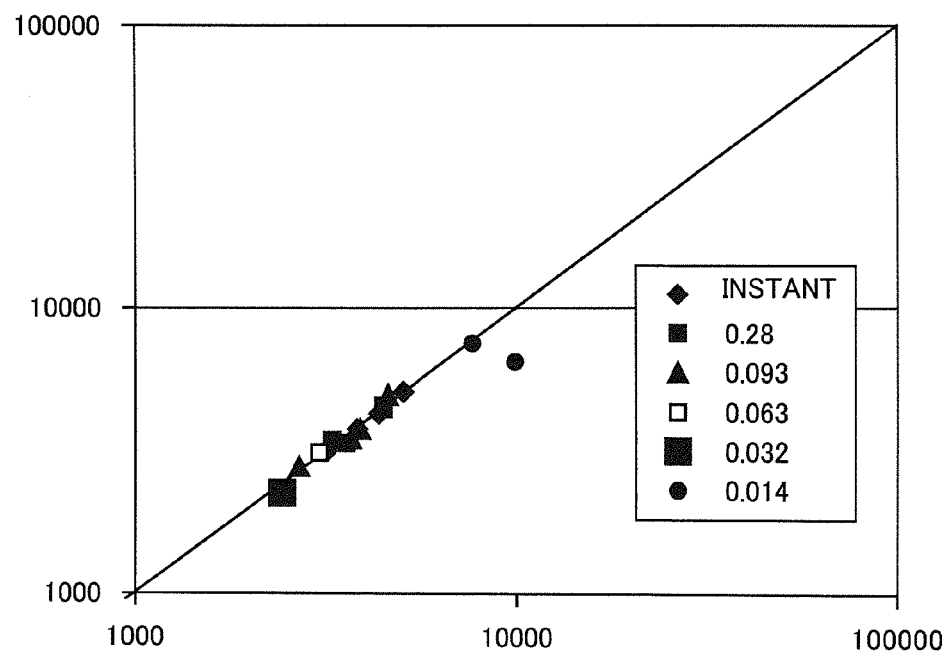
FIG. 45 shows a relation between the target color temperature read from FIG. 41 and the target color temperature read from FIG. 43, for each dimming rate.
Figure 46:
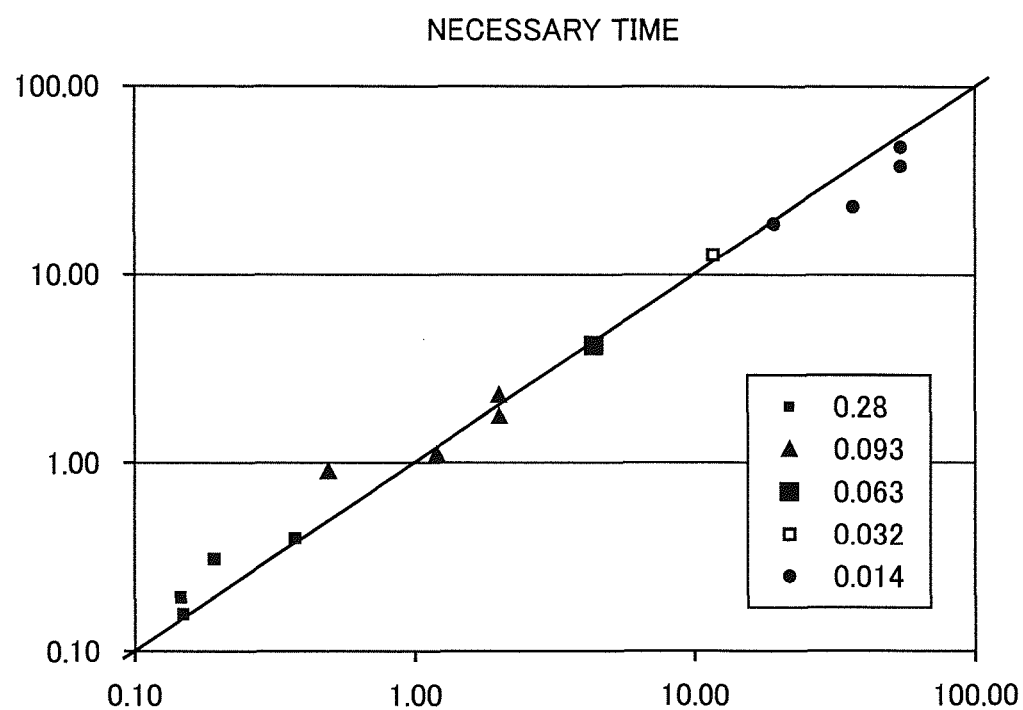
FIG. 46 shows a relation between the time necessary for the change of color temperature read from FIG. 41 and the time necessary for the change of color temperature read from FIG. 43, for each dimming rate.

FIG. 44 shows a relation between the change rate of color temperature read from FIG. 41 and the change rate of color temperature read from FIG. 43, for each dimming rate. FIG. 45 shows a relation between the target color temperature $Tc_2$ read from FIG. 41 and the target color temperature $Tc_2$ read from FIG. 43, for each dimming rate. FIG. 46 shows a relation between the time t necessary for the change of color temperature read from FIG. 41 and the time t necessary for the change of color temperature read from FIG. 43, for each dimming rate.

It can be seen from FIGS. 44 to 46 that when the values read from FIG. 41 and the values read from FIG. 43 are plotted on graphs, the values are substantially the same. Therefore, it has been verified that these are correlated. It is understood that the PWM control using the relation shown in FIG. 41 and the PWM control using the relation shown in FIG. 43 realize substantially the same control.

<Effects of the Embodiments>

If the relations among the initial output $E_1$, the target output $E_2$ and the time t necessary for the change that can be accepted by the user such as shown in FIGS. 17 and 18 are stored in lighting device 1, it becomes possible in lighting device 1 to specify, from the initial output $E_1$ and target output $E_2$, the time t for reducing brightness realizing the light emission output change rate acceptable to the user at the time of brightness reduction.

Further, if the relations among the initial color temperature $Tc_1$, the target color temperature $Tc_2$ and the time t necessary for the change that can be accepted by the user such as shown in FIGS. 41 and 43 are stored, it becomes possible in lighting device 1 to specify, from the initial color temperature $Tc_1$ and the target color temperature $Tc_2$, the time t realizing the change rate acceptable to the user at the time of changing color temperature.

Further, since such a control that reduces the light emission output at such a change rate that realizes a linear relation between the light emission output and the elapsed time as represented by the solid line in FIG. 5 in a semi logarithmic graph in which the abscissa is a linear axis representing time and the ordinate is a logarithmic axis representing light emission output is performed in lighting device 1, it becomes possible to reduce brightness in energy-saving manner without causing any discomfort to the user.

<Other Examples>

It is noted that such controls as described with reference to the flows above may be realized by computer functions. Such a program may be stored in a non-transitory computer-readable recording medium such as a flexible disk, a CD-ROM (Compact Disk-Read Only Memory), an ROM (Read Only Memory), an RAM (Random Access Memory) or a memory card associated with the computer, and provided as a program product. Alternatively, the program may be provided recorded on a recording medium such as a built-in hard disk of the computer, or the program may be provided by downloading it through a network.

The program may be one that calls necessary modules among program modules provided as a part of an operating system (OS) of a computer, in a prescribed order and at prescribed timing, to execute the process. In that case, the program itself does not contain the modules, and the process is executed in cooperation with the OS. Such a program that does not include any module is also encompassed by the program of the present invention.

Further, the program in accordance with the present invention may be provided incorporated as a part of another program. In that case also, the program itself does not include the modules included in the said another program, and the process is executed in cooperation with the said another program. Such a program incorporated in another program is also encompassed by the program of the present invention.

The provided program product is executed installed in a program storage such as a hard disk. The program product includes the program itself and the recording medium on which the program is recorded.

The lighting device 1 in accordance with the present invention is applicable not only to a so-called ceiling light illustrated in FIG. 1 but also to lighting devices of any form that allows dimming control, including a down-light and a pendant light.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST 1 lighting device, 2 chassis, 8, 9 cover, 10 power source circuit, 20 illumination control unit, 21 control power supply circuit, 22 CPU, 23 PWM control circuit, 25 signal receiving unit, 26 SW input unit, 29 memory, 30 illuminating unit, 31 module, 33 FET switch, 40 interface unit, 41 infrared receiving unit, 50 remote controller.

The invention claimed is:
1. A lighting device, comprising:
   a light emitting unit; and
   a control circuit for executing output control of said light emitting unit; wherein:
   when a light emission output of the light emitting unit is to be changed, said control circuit gradually changes light emission output of said light emitting unit, linearly from a first light emission output $E_1$ to a second light emission output $E_2$ in a prescribed time T from a start of said change, on a semi: logarithmic graph having abscissa as a linear axis representing time and ordinate as a logarithmic axis representing light emission output; and
   said prescribed time T is defined by determining said first light emission output $E_1$ and said second light emission output $E_2$ in a formula:

$$T = k \cdot \exp(mE_1) \cdot E_2\hat{\ }(q \cdot \ln E_1 + n)$$

or $$T = k \cdot \exp(mE_1) \cdot E_2\hat{\ }(q'E_1 n')$$

(where k, m, q (q'), n (n') are constants).

2. The lighting device according to claim 1, further comprising a memory for storing correspondence relations among the first light emission output $E_1$, the second light emission output $E_2$, and the prescribed time T calculated using said formula, wherein
   when said control circuit receives inputs designating the first light emission output $E_t$ and the second light emission output $E_2$, or an input designating the first light emission output $E_1$, said control circuit reads the prescribed time T corresponding to the inputs or the input from said memory, and thereby executes output control of said light emitting unit.

3. The light device according to claim 1, wherein
   when said control circuit receives inputs designating the first light emission output $E_1$ and the second light emission output $E_2$, or an input designating the first light emission output $E_1$, said control circuit calculates the prescribed time T corresponding to the inputs or the input, and thereby executes output control of said light emitting unit.

4. A lighting device, comprising:
   a light emitting unit; and
   a control circuit for executing output control of said light emitting unit; wherein:
   when a color temperature is to be changed as a light emission output of the light emitting unit, said control circuit gradually changes a color temperature, linearly from a an initial color temperature $Tc_1$ as a first light emission output to a target color temperature $Tc_2$ as a second light emission output in a prescribed time T from a start of said change, on a semi-logarithmic graph having abscissa as a linear axis representing time and ordinate as a logarithmic axis representing light emission output; and
   said prescribed time T is defined by determining said initial color temperature $Tc_1$ and said target color temperature $Tc_2$ in a formula:

$$\log(R) = +A \cdot STc^v$$

if the initial color temperature $Tc_1 <$ the target color temperature $Tc_2$, and $$\log(R) = -A \cdot STc^v$$

if the initial color temperature $Tc_1 >$ the target color temperature $Tc_2$
   (where color temperature change rate $R = Tc_2/Tc_1$, dimming rate $STc = |\log(Tc_1) - \log(Tc_2)|/T = |\log(R)|/T$, constant:v)
   where constant A is a constant defined by determining the initial color temperature $Tc_1$ and the target color temperature $Tc_2$.

5. The lighting device according to claim 4, wherein
   said constant A is represented as $A = a \cdot Tc_1 + b$ (initial color temperature $Tc_1 <$ target color temperature $Tc_2$), $A = a \cdot Tc_1 + d$ (initial color temperature $Tc_1 >$ target color temperature $Tc_2$)

(where constants: a, b, c, d).

\* \* \* \* \*